(12) United States Patent
Kaku et al.

(10) Patent No.: US 6,455,606 B1
(45) Date of Patent: Sep. 24, 2002

(54) POLYURETHANE FOAM, PROCESS FOR PRODUCING THE SAME, AND FOAM FORMING COMPOSITION

(75) Inventors: Motonao Kaku, Kyoto (JP); Yasushi Kumagai, Kyoto (JP); Toru Nakanishi, Kyoto (JP); Tatsuroh Yanagi, Kyoto (JP); Tsuyoshi Tomosada, Kyoto (JP); Kunikiyo Yoshio, Kyoto (JP); Hajime Akiyama, Kyoto (JP); Sadao Kubota, Kyoto (JP); Jiro Ryugo, Kyoto (JP); Yuichi Sasatani, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 0 days.

(21) Appl. No.: 09/402,303

(22) PCT Filed: Mar. 26, 1998

(86) PCT No.: PCT/JP98/01388

§ 371 (c)(1),
(2), (4) Date: Oct. 1, 1999

(87) PCT Pub. No.: WO98/44016

PCT Pub. Date: Oct. 8, 1998

(30) Foreign Application Priority Data

| Apr. 2, 1997 | (JP) | 9-100967 |
| Jun. 27, 1997 | (JP) | 9-187497 |
| Sep. 29, 1997 | (JP) | 9-283067 |
| Sep. 30, 1997 | (JP) | 9-284557 |
| Dec. 1, 1997 | (JP) | 9-347271 |
| Dec. 26, 1997 | (JP) | 9-368855 |

(51) Int. Cl.$^7$ .............................................. C08G 18/04
(52) U.S. Cl. ...................... 521/170; 521/137; 521/142; 521/147; 521/163; 521/172; 521/173; 521/174
(58) Field of Search ................................ 521/137, 163, 521/172, 173, 174, 142, 147, 170

(56) References Cited

U.S. PATENT DOCUMENTS

| 4,110,274 A | 8/1978 | Corbett et al. |
| 4,673,696 A | 6/1987 | Tsai |
| 4,743,628 A | 5/1988 | Conkey et al. |
| 5,091,436 A | 2/1992 | Frisch et al. |
| 5,093,380 A | 3/1992 | Takeyasu et al. |
| 5,219,893 A | * 6/1993 | Konig et al. ................. 521/173 |
| 5,300,535 A | 4/1994 | Takeyasu et al. |
| 5,349,040 A | * 9/1994 | Trinks et al. ................ 521/163 |
| 5,401,785 A | 3/1995 | Kumagai et al. |

FOREIGN PATENT DOCUMENTS

| DE | 3127945 | 1/1983 |
| EP | 0 443 614 | 8/1991 |
| JP | 49-17039 | 4/1974 |
| JP | 49-85196 | 8/1974 |
| JP | 49-109496 | 10/1974 |
| JP | 50-92998 | 7/1975 |
| JP | 54-68897 | 6/1979 |
| JP | 63-23956 | 2/1988 |
| JP | 63-99217 | 4/1988 |
| JP | 3-244620 | 10/1991 |
| JP | 4-356517 | 12/1992 |
| JP | 5-132536 | 5/1993 |
| JP | 5-155963 | 6/1993 |
| JP | 5-506467 | 9/1993 |
| JP | 6-329747 | 11/1994 |
| WO | WO 91/13112 | 9/1991 |
| WO | WO 97/39836 | 10/1997 |

* cited by examiner

*Primary Examiner*—John M. Cooney, Jr.
(74) *Attorney, Agent, or Firm*—Merchant & Gould P.C.

(57) ABSTRACT

A polyurethane foam which is obtained by reacting an addition-polymerizable active hydrogen component comprising a compound having a group containing active hydrogen and an addition-polymerizable functional group or comprising both this compound and a compound containing at least 2.5 groups (on the average) containing active hydrogen and not containing addition-polymerizable functional groups with an organic polyisocyanate in the presence or absence of at least one auxiliary selected from the group consisting of foaming agents and additives to polymerize the addition-polymerizable functional group and simultaneously form a polyurethane, and which has a structure in which the chains formed by the addition polymerization have been cross-linked to the polyurethane chains. The polyurethane foam is useful as a rigid polyurethane foam excellent in hardness, dimensional stability, etc. and usable as a heat insulator, shock-absorbing material, synthetic wood, etc., or is useful as a soft polyurethane foam reduced in compression set and usable as a cushioning material, shock-absorbing material, sound insulating/absorbing material, etc.

29 Claims, No Drawings

US 6,455,606 B1

POLYURETHANE FOAM, PROCESS FOR PRODUCING THE SAME, AND FOAM FORMING COMPOSITION

INDUSTRIAL FIELD

The present invention relates to a polyurethane foam excellent in mechanical properties, a process for producing the same, and a foam forming composition. More particularly, the present invention relates to a polyurethane foam having a structure in which polymer chains formed by an addition-polymerization reaction (hereinafter abbreviated as addition-polymerization chains) and polyurethane chains are cross-linked to each other, which is excellent in mechanical properties such as hardness and dimensional stability in the case of forming a rigid foam, and which has mechanical properties such as reduced compression set in the case of forming a flexible foam.

INDUSTRIAL BACKGROUND

Polyurethane foams having addition-polymerization chains and polyurethane chains have been disclosed, for example, in Japanese Publication of Unexamined Patent Application (Tokkai) No. HEI 3-244620 (Document 1), and Japanese Publication of Unexamined Patent Application (Tokkai) No. SHO 63-23956 (Document 2).

The Japanese Publication of Unexamined Patent Application (Tokkai) No. HEI 3-244620 (Document 1) discloses an elastic polyurethane foam obtained by reacting a high molecular weight polyol such as a polyoxyalkylene polyol having a hydroxyl value of 5 to 38 with a polyisocyanate compound in the presence of a low viscosity compound having an addition-polymerizable unsaturated group, a catalyst, and a blowing agent. Furthermore, Document 1 discloses that a compound having zero or one, particularly zero functional group capable of reacting with an isocyanate may be used as the low viscosity compound having an addition-polymerizable unsaturated group, and indicates that if a compound having many functional groups is used, it is incorporated in the polyurethane chains and causes undesirable cross-linking.

Japanese Publication of Unexamined Patent Application (Tokkai) No. SHO 63-23956 (Document 2) discloses a polyurethane that is obtained by admixing a mixture of a long-chain polyol and a short-chain diol with an ethylenic unsaturated esterol such as alkyl hydroxy acrylate or alkyl hydroxy methacrylate to prepare a polyol mixture having storage stability, and reacting the polyol mixture with an organic polyisocyanate by a method such as RIM (reaction injection molding). It is also disclosed in the Document 2 that a blowing agent may be included as an optional component in the RIM.

It is a first object of the present invention to provide a polyurethane foam excellent in mechanical properties.

It is another object of the present invention to provide a rigid polyurethane foam excellent in mechanical properties such as hardness and dimensional stability.

It is a further object of the present invention to provide a flexible polyurethane foam which has mechanical properties such as reduced compression set and in which ball rebound is not reduced even when its density is decreased.

It is a still further object of the present invention to obtain a rigid polyurethane foam that has equal dimensional stability and equal or higher mechanical strength as compared to the case of using conventional monochlorotrifluorocarbon (CFC-11), and has good thermal insulation and flame resistance, when producing a rigid polyurethane foam in the presence of at least one blowing agent selected from hydrogen atom-containing halogenated hydrocarbon, water, low boiling point hydrocarbon, and liquefied carbon dioxide gas.

It is a still further object of the present invention to provide a rigid polyurethane foam reinforced with staple fiber having a high bending strength and a high bending modulus.

SUMMARY OF THE INVENTION

Other objects of the present invention, which will be apparent from the above and below descriptions, are broadly achieved by the following polyurethane foam:

A polyurethane foam which is obtained by reacting an addition-polymerizable active hydrogen component comprising a compound having an active hydrogen-containing group and an addition-polymerizable functional group or comprising this compound and a compound having at least 2.5 groups (on the average) containing active hydrogen and not having an addition-polymerizable functional group with an organic polyisocyanate in the presence or absence of at least one auxiliary selected from the group consisting of blowing agents and additives to polymerize the addition-polymerizable functional group and simultaneously form a polyurethane, and which has a structure in which the addition-polymerization chains are cross-linked to the polyurethane chains.

As the above-mentioned addition-polymerizable active hydrogen component, an addition-polymerizable active hydrogen component (A) comprising a compound (A1) having at least one group containing active hydrogen (w) and at least one addition-polymerizable functional group (x) or comprising the compound (A1) and a compound (A2) having at least 2.5 groups (w) (on the average) and not having the group (x) may be employed. When using a combination of the compounds (A1) and (A2) in the component (A), the combination is selected from ① to ③ below:

① a compound (A11) having one group (w) as the compound (A1), and a compound with a value of active hydrogen-containing group of at least 40 as the compound (A2);

② a compound (A12) having at least two groups (w) as the compound (A1), and the compound (A2);

③ the compound (A11), the compound (A12), and the compound (A2).

Hereinafter, a polyurethane foam obtained using an addition-polymerizable active hydrogen component (A) is referred to as a polyurethane foam [1].

Furthermore, the following addition-polymerizable active hydrogen component (A') also may be used as the above-mentioned addition-polymerizable active hydrogen component.

Addition-polymerizable active hydrogen component (A'): an addition-polymerizable active hydrogen component that comprises the active hydrogen-containing group (w) and an addition-polymerizable functional group (x), and which is selected from (A31), (A32), and (A33) below; wherein the reaction rate constant K1 between the active hydrogen-containing group (w) and an isocyanate group (z) at 120° C. is not more than 1 (liter/mol/sec); the polymerization reaction rate constant K2 of the addition-polymerizable functional group (x) is not less than 10 (liter/mol/sec); and K2/K1 is not less than 100.

(A31): an addition-polymerizable active hydrogen compound which has the active hydrogen-containing group (w) and the addition-polymerizable functional group (x), and which may have a cyclic group (y) reactive with the group (w).

(A32): an active hydrogen compound (A321) having at least three groups (w) or having the groups (w) and (y), and an addition-polymerizable compound (A322) having the groups (x) and (y), used in combination.

(A33): the compound (A31), the compound (A321) and/or the compound (A322), used in combination.

Hereinafter, a polyurethane foam obtained using an addition-polymerizable active hydrogen component (A') is referred to as a polyurethane foam [2].

DETAILED DESCRIPTION OF THE INVENTION

In the polyurethane foam of the present invention, the addition-polymerizable active hydrogen component (A) comprises at least one compound (A1) having at least one group containing active hydrogen (w) and at least one addition-polymerizable functional group (x), or comprises the compound (A1) and at least one compound (A2) having at least 2.5 groups (w) (on the average) and not having the group (x).

The active hydrogen-containing group (w) in the compound (A1) may be at least one group containing active hydrogen selected from hydroxyl, mercapto, carboxyl, primary amino, and secondary amino groups, etc., and preferably used is a hydroxyl group. Examples of the addition-polymerizable functional group (x) in the compound (A1) include radical-polymerizable functional groups of the terminal olefin type or the internal olefin type, cationic-polymerizable functional groups (e.g. vinyl ether group, propenyl ether group), and anionic-polymerizable functional groups (e.g. vinyl carboxyl group, cyano acryloyl group). Preferable are radical-polymerizable functional groups, and particularly preferable are radical-polymerizable functional groups of terminal olefin type. The compound (A1) usually has from 1 to 10, preferably from 1 to 5 addition-polymerizable functional groups (x), and usually from 1 to 8, preferably from 1 to 5 groups containing active hydrogen (w).

As the compound (A1) preferable is at least one active hydrogen compound having an active hydrogen-containing group (w) and also having a radical-polymerizable functional group of terminal olefin type represented by the general formula (1) below (1)

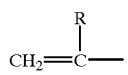

wherein R denotes hydrogen, an alkyl group having 1 to 15 carbon atoms, or an aryl group having 6 to 21 carbon atoms.

Particularly, active hydrogen compounds having an acryloyl group or a methacryloyl group are preferably employed as the at least one active hydrogen compound having a radical-polymerizable functional group represented by the general formula (1).

As the compound (A1), more preferably used is a compound represented by the general formula (3) below (3)

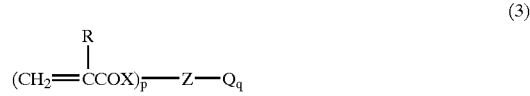

wherein R denotes hydrogen, an alkyl group having 1 to 15 carbon atoms, or an aryl group having 6 to 21 carbon atoms; X denotes O, S, or NH; p and q denote positive integers; Q denotes an active hydrogen-containing group; and Z denotes a residue of an active hydrogen compound from which (p+q)groups containing active hydrogen are removed, respectively. R is preferably hydrogen or an alkyl group, particularly preferably hydrogen or methyl group; and X is preferably O. The value of p is preferably from 1 to 7, more preferably from 1 to 5. The value of q is preferably from 1 to 7, more preferably from 1 to 4. In the case of the flexible foam mentioned below, because the concentrations of the addition-polymerizable functional group and the active hydrogen-containing group are low, elongation or tear strength of the obtained foam may be decreased if q is less than 2. Thus, the value of q is particularly preferably from 2 to 4. Furthermore, the value of (p+q) is preferably from 2 to 8, and in the case of a flexible foam, more preferably it is from 3 to 8. Furthermore, it is preferable to employ hydroxyl group as Q.

Examples of the compounds (A1) include (A1/1) to (A1/4) as follows:

(A1/1): partial esters of unsaturated carboxylic acids with polyols [polyhydric alcohols; polyhydric phenols; polyether polyols in which alkylene oxides (AO) are added to polyhydric alcohols or to polyhydric phenols; polyether polyols in which AO are added to amines; polyester polyols derived from polyhydric alcohols and polycarboxylic acids, and the like]

(A1/2): partially amidated unsaturated carboxylic acids with amines (A1/3): partial thioesters of unsaturated carboxylic acids with polythiols (A1/4): vinyl monomers having a hydroxyl group The polyhydric alcohols among the polyols used in producing the compounds (A1/1) include, for example, dihydric alcohols [ethylene glycol, diethylene glycol, propylene glycol, dipropylene glycol, 1,4-butanediol, 1,6-hexanediol, 1,3-butylene glycol, neopentyl glycol, and the like], alcohols with a value of 3 to 8 or more [glycerol, trimethylolpropane, pentaerythritol, diglycerol, α-methylglucoside, sorbitol, xylitol, mannitol, glucose, fructose, sucrose, and the like], and combinations of two or more of these.

The polyhydric phenols among the polyols used in producing the compounds (A1/1) include, for example, hydroquinone, bisphenols (bisphenol A, bisphenol F, etc.), formalin low condensation products of phenol compounds (novolac resin, intermediate of resol), and combinations of two or more of these.

The amines in the polyether polyols in which AO are added to amines among the polyols used in producing the compounds (A1/1) include, for example, ammonia; alkanolamines [mono-, di-, or triethanolamine, isopropanolamine, aminoethylethanolamine, and the like]; alkylamines having 1 to 20 carbon atoms [methylamine, ethylamine, n-butylamine, octylamine, and the like]; alkylenediamines having 2 to 6 carbon atoms [ethylenediamine, hexamethylenediamine, and the like]; polyalkylene polyamines having 2 to 6 carbon atoms in the alkylene groups [diethylenetriamine, triethylenetetramine, and the like]; aromatic amines having 6 to 20 carbon atoms [aniline, phenylenediamine, diaminotoluene, xylylenediamine, methylenedianiline, diphenyl ether diamine, and the like]; alicyclic amines having 4 to 15 carbon atoms [isophoronediamine, cyclohexylenediamine, and the like]; heterocyclic amines having 4 to 15 carbon atoms [piperazine, N-aminoethylpiperazine, 1,4-diaminoethylpiperazine, and the like], and combinations of two or more of these.

The alkylene oxides (AO) which are added to polyhydric alcohols, polyhydric phenols, or amines include, for example, ethylene oxide (hereinafter abbreviated as EO), propylene oxide (hereinafter abbreviated as PO), 1,2-, 1,4- or 2,3-butylene oxide, styrene oxide, and the like, and combinations of two or more of these (when using combinations of two or more of these AO, either random addition or block addition may be employed), but it is not limited only to these examples. Among these examples, it is preferable to use those containing PO and/or EO as main components and containing not more than 20 mass % of other alkylene oxides. The addition reaction may be performed by conventional methods.

The polyhydric alcohols used in the polyester polyols among the polyols used in producing the compounds (A1/1) are same as described above. The polycarboxylic acids include aliphatic polycarboxylic acids [succinic acid, adipic acid, sebacic acid, maleic acid, fumaric acid, and the like], aromatic polycarboxylic acids [phthalic acid or its isomers, trimellitic acid, and the like], ester-forming derivatives of these polycarboxylic acids [acid anhydrides, lower alkyl esters having 1 to 4 carbon atoms in the alkyl groups, and the like], and combinations of two or more of these.

The compounds (A1/1) are obtained by partially esterifying the polyols listed above with unsaturated carboxylic acids. The unsaturated carboxylic acids include, for example, (meth)acrylic acid, crotonic acid, maleic acid, fumaric acid, itaconic acid, citraconic acid, mesaconic acid, aconitic acid, cinnamic acid, vinylbenzoic acid, and the like, and combinations of two or more of these [the (meth)acrylic acid herein refers to acrylic acid and/or methacrylic acid, and hereinafter also is referred to in the same way]; ester-forming derivatives of these unsaturated carboxylic acids, for example, halides [e.g. (meth)acrylic acid chloride], acid anhydrides [e.g. maleic acid anhydride, itaconic acid anhydride, and citraconic acid anhydride]; and combinations of two or more of these.

Examples of the compounds (A1/1) include 2-hydroxyethyl (meth)acrylate, 2-hydroxypropyl (meth)acrylate, 4-hydroxybutyl (meth)acrylate, 3-phenoxy-2-hydroxypropyl (meth)acrylate, glycerol mono(meth)acrylate, glycerol di(meth)acrylate, diethylene glycol mono(meth)acrylate, and the like, and combinations of two or more of these.

The compounds (A1/2) are obtained by reacting the above-mentioned unsaturated carboxylic acids with the polyamines or alkanolamines among the above-mentioned amines. Examples include (meth)acrylamido ethyl amine, (meth)acrylamido hexyl amine, and the like, and combinations of two or more of these.

The polythiols used in producing the compounds (A1/3) include, for example, ethanedithiol, 1,2-propanedithiol, 1,3-propanedithiol, 1,4-butanedithiol, 1,4-benzenedithiol, 1,2-benzenedithiol, bis(4-mercaptophenyl) sulfide, 4-t-butyl-1, 2-benzenedithiol, ethylene glycol dithioglycolate, trimethylolpropanetris(thioglycolate) thiocyanuric acid, di(2-mercaptoethyl) sulfide, di(2-mercaptoethyl) ether, and combinations of two or more of these. The compounds (A1/3) are obtained by reacting these polythiols with the above-mentioned unsaturated carboxylic acids. Examples of the compounds (A1/3) include acryloyl thioethyl mercaptan, acryloyl thiobutyl mercaptan, and the like, and combinations of two or more of these.

Examples of the compounds (A1/4) include p-hydroxylstyrene, (meth)allyl alcohol, cinnamyl alcohol, crotonyl alcohol, adducts of the above-mentioned alkylene oxides (AO) to these compounds, and combinations of two or more of these.

Preferable among these are partial esters of unsaturated carboxylic acids with polyols among the compounds (A1/1), particularly preferably partial esters of unsaturated carboxylic acids with polyhydric alcohols or their AO adducts, most preferably diethylene glycol mono(meth)acrylate, because they have low viscosity and this also lowers the viscosity of a polyurethane-forming composition when used.

Considering its viscosity-reducing effect in a polyurethane-forming composition, the molecular weight of the compound (A1) per an active hydrogen-containing group is preferably from 40 to 2,500. For the rigid foams described below, it is more preferably from 40 to 500, particularly preferably from 45 to 300.

The compound (A2) is at least one compound having at least 2.5 (on the average), preferably 3 to 8 groups containing active hydrogen (w), and not having an addition-polymerizable functional group (x).

If the number of active hydrogen-containing groups is less than 2.5 (on the average), in the case of forming a rigid foam, mechanical properties such as hardness and dimensional stability are reduced, and in the case of forming a flexible foam, compression set increases.

The active hydrogen-containing group (w) in the compound (A2) may be at least one group containing active hydrogen selected from hydroxyl, mercapto, and amino groups.

Suitable examples of the compounds (A2) are those having 3 to 8 active hydrogen-containing groups selected from hydroxyl, mercapto, and amino groups, preferably hydroxyl group. Examples include the above-mentioned polyhydric alcohols, polyhydric phenols, amines [diamines, polyamines, alkanolamines], polyether polyols, polyester polyols, and the like, particularly preferably at least one polyol selected from the group consisting of polyether polyols and polyester polyols.

The polyether polyols may be known polyether polyols commonly used in polyurethane foams, e.g. adducts of the above-mentioned alkylene oxides (AO) to the above-mentioned polyhydric alcohols, polyhydric phenols, polycarboxylic acids, amines, and the like. It is preferable to use those containing PO and/or EO as main components and containing not more than 20 mass % of other alkylene oxides as the AO, particularly preferably PO and/or EO. The polyester polyols may be known polyester polyols commonly used in polyurethane foams, e.g. polyester polyols derived from the above-mentioned polyhydric alcohols or polyhydric phenols and the above-mentioned polycarboxylic acids. Among these compounds (A2) particularly preferable are polyether polyols in which AO is added to polyhydric alcohols. Moreover, the number average molecular weight of the compound (A2) is preferably from 50 to 10,000, particularly preferably from 60 to 8,000.

In the present invention, a vinyl polymer (F) also may be further dispersed in the compound (A2) as needed. The vinyl polymer (F) may be dispersed in the (A2) after it is polymerized, but preferably it is dispersed by polymerizing a vinyl monomer (f) in the (A2) to be stabilized. Examples of the vinyl monomer (f) include acrylonitrile, styrene, vinylidene chloride, alkyl (meth)acrylate, and the like, and preferable are acrylonitrile and styrene. The amount of the (F) is usually from 5 to 50 mass parts, preferably from 15 to 45 mass parts per 100 mass parts of the (A2).

It is preferable that the reaction rate constant K1 between the active hydrogen-containing group (w) in each of the compounds (A1) and (A2) and an isocyanate group (z) in (B) at 120° C. is not more than 1 (liter/mol/sec); the polymerization reaction rate constant K2 of the addition-polymerizable functional group (x) in (A1) is not less than 10 (liter/mol/sec); and K2/K1 is not less than 100.

The ratio of the (A1) contained in the component (A) based on the total mass of the compounds (A1) and (A2) is usually from 1 to 100 mass %, more preferably from 2 to 100 mass %. For the rigid foams described below, it is more preferably from 5 to 100 mass %, particularly preferably from 10 to 95 mass %.

An essential component in the component (A) is a compound (A1) or a combination of compounds (A1) and (A2). When a combination is used, it is selected from ① to ③ below:

① a compound (A11) having one group containing active hydrogen (w) as the compound (A1), and a compound having a value of active hydrogen-containing group of at least 40 as the compound (A2),
  wherein the value of active hydrogen-containing group refers to "56100/(equivalent of active hydrogen)", i.e. "56100/(molecular weight per an active hydrogen-containing group)";

② a compound (A12) having at least two groups containing active hydrogen (w) as the compound (A1), and the compound (A2);

③ the compound (A11), the compound (A12), and the compound (A2).

That is, when the compound (A2) used in the combination has a value of active hydrogen-containing group of 40 or more, the compound (A1) may be either the compound (A11) having one group containing active hydrogen (w) or the compound (A12) having at least two groups (w). However, when the compound (A2) used in the combination has a value of active hydrogen-containing group of less than 40, it is necessary to use at least partially the compound (A12) having at least two groups containing active hydrogen (w) as the compound (A1). This is because, when the compound (A2) is a long chain compound with a value of active hydrogen-containing group of less than 40, which is considerably low, one group containing active hydrogen (w) that is contained in the compound (A1) is not enough to keep a sufficient degree of cross-linking of the addition-polymerization chains per a length of the polyurethane chains formed. On the other hand, when the compound (A2) has a relatively short chain with a value of active hydrogen-containing group of 40 or more, a sufficient degree of crosslinking of the addition-polymerization chains per a length of the polyurethane chains formed is ensured, even when the compound (A1) has only one group containing active hydrogen (w). Because sufficient crosslinking is ensured, when forming a rigid foam, polyurethane foams excellent in mechanical properties such as hardness and dimensional stability can be obtained, and when forming a flexible foam, polyurethane foams having mechanical properties such as small compression set can be obtained. Also, because of the same reason, when using only the compound (A11) as the (A1) in a combination of the (A1) and (A2), it is preferable to use a compound having a value of active hydrogen-containing group of at least 60, particularly preferably at least 100, as the compound (A2). In each case of the above ① to ③, the amount of the compound (A1) based on the total mass of the compounds (A1) and (A2) is preferably from 1 to 99 mass %, more preferably from 2 to 95 mass %. In the case of ③, the amount of the compound (A12) based on the total mass of the compounds (A11) and (A12) is preferably at least 5 mass %, more preferably at least 20 mass %.

In the present invention, at least one compound (A0) containing an addition-polymerizable functional group and not having an active hydrogen-containing group also can be used in the component (A) as needed. As the addition-polymerizable functional group in the (A0), the same groups as in the compound (A1) may be employed, and preferable are radical-polymerizable functional groups. Examples of the radical-polymerizable functional groups include acryloyl, methacryloyl, vinyl, vinylbenzyl, vinylphenyl, and allyl ether groups, and the like. A preferable radical-polymerizable functional group is an acryloyl or methacryloyl group.

The number of the addition-polymerizable functional groups in the compound (A0) is usually from 1 to 10, preferably from 1 to 8. When increase of the mechanical strength is significant, the number of the addition-polymerizable functional groups in the (A0) is preferably from 2 to 8, particularly preferably from 4 to 8. Considering to lower the viscosity of the polyurethane-forming composition, the viscosity of the compound (A0) is preferably not more than 1,000 mPa·s (at 25° C.), particularly preferably not more than 500 mPa·s (at 25° C.). Furthermore, the (A0) also may be contained in the component (A) along with the (A1) as a by-product which is simultaneously formed when producing the (A1). The amount of the (A0) is usually not more than 80 mass %, preferably not more than 60 mass %, particularly preferably not more than 40 mass % based on the total mass of the (A1) and (A0).

As the compound (A0), aromatic hydrocarbon monomers [styrene, α-methyl styrene, etc.], unsaturated nitriles [(meth) acrylonitrile etc.], and the like may be employed, but preferable examples of the (A0) are the (A01) to (A03) as follows:

(A01) esters of unsaturated carboxylic acids with polyols [polyhydric alcohols; polyhydric phenols; polyether polyols in which alkylene oxides (AO) are added to these compounds; polyether polyols in which AO are added to amines; polyester polyols derived from polyhydric alcohols and polycarboxylic acids; and the like]
(A02) amidated unsaturated carboxylic acids with amines
(A03) thioesters of unsaturated carboxylic acids with polythiols The compound (A01) is obtained by reacting the polyols and unsaturated carboxylic acids used in producing the above-mentioned compound (A11) in a molar ratio different from that in the (A11). The compound (A02) is obtained by reacting the polyamines or alkanolamines and the unsaturated carboxylic acids used in producing the above-mentioned compound (A12) in a molar ratio different from that in the (A12). The compound (A03) is obtained by reacting the polythiols and the unsaturated carboxylic acids used in producing the above-mentioned compound (A13) in a molar ratio different from that in the (A13).

The polyurethane foam [1] of the present invention is obtained by reacting the component (A) with an organic polyisocyanate (B) in the presence or absence of at least one auxiliary (C) selected from the group consisting of blowing agents (C1) and additives (C2) to polymerize the addition-polymerizable functional group and simultaneously form a polyurethane.

In the present invention, it is understood that to polymerize the addition-polymerizable functional group and simultaneously form a polyurethane means that the polymerization of the addition-polymerizable functional group and the polyurethane-forming reaction are carried out simultaneously at least partially during the reaction period. In order to improve the mechanical properties of the polyurethane with increased crosslinking density, it is preferable that the other reaction is initiated before a resin is formed through a curing in one reaction, so that the two reactions are carried out simultaneously.

As the organic polyisocyanate (B), conventional materials used in producing polyurethane foams may be employed. Examples of such isocyanates include aromatic polyisocyanates (B1), aliphatic polyisocyanates (B2), alicyclic polyisocyanates (B3), araliphatic polyisocyanates (B4), modified polyisocyanates (B5), and mixtures of two or more of these.

The aromatic polyisocyanates (B1) include aromatic diisocyanates having 6 to 16 carbon atoms (not including the carbon atoms in the NCO group; this also applies to the isocyanates mentioned below), aromatic triisocyanates having 6 to 20 carbon atoms, crude materials of these isocyanates, and the like. Examples of (B1) are 1,3- and 1,4-phenylene diisocyanates, 2,4- and 2,6-tolylene diisocyanates (TDI), crude TDI, 2,4'- and 4,4'-diphenylmethane diisocyanates (MDI), crude MDI, polymethylene polyphenyl isocyanate (polymeric MDI), naphthylene-1,5-diisocyanate, triphenylmethane-4,4',4"-triisocyanate, and the like.

The aliphatic polyisocyanates (B2) include aliphatic diisocyanates having 6 to 10 carbon atoms and the like. Examples of (B2) are 1,6-hexamethylene diisocyanate (HDI), 2,2,4-trimethylhexamethylene diisocyanate, lysine diisocyanate, and the like.

The alicyclic polyisocyanates (B3) include alicyclic diisocyanates having 6 to 16 carbon atoms and the like. Examples of (B3) are isophorone diisocyanate (IPDI), 4,4'-dicyclohexylmethane diisocyanate, 1,4-cyclohexane diisocyanate, norbornane diisocyanate, and the like.

The araliphatic polyisocyanates (B4) include araliphatic diisocyanates having 8 to 12 carbon atoms and the like. Examples of (B4) are xylylene diisocyanate, α,α,α',α'-tetramethylxylylene diisocyanate, and the like.

The modified polyisocyanates (B5) include modified materials of the (B1) to (B4) (carbodiimide modified materials, allophanate modified materials, urea modified materials, biuret modified materials, isocyanurate modified materials, oxazolidone modified materials, and the like). Examples of (B5) are urethane modified MDI, carbodiimide modified MDI, urethane modified TDI, biuret modified HDI, isocyanurate modified IPDI, and the like.

Among these listed as the organic polyisocyanates (B), preferable are at least one organic polyisocyanate selected from TDI, MDI, crude TDI, crude MDI, urethane modified TDI, urethane modified MDI, and carbodiimide modified MDI.

The blowing agents (C1) as optional components may be at least one selected from hydrogen atom-containing halogenated hydrocarbons, water, low boiling point hydrocarbons, and liquefied carbon dioxide gas. These are used when foaming with blowing agents.

Examples of the hydrogen atom-containing halogenated hydrocarbons include HCFC types (hydrochlorofluorocarbon types) (e.g. HCFC-123, HCFC-141b, HCFC-22, and HCFC-142b), HFC types (hydrofluorocarbon types) (e.g. HFC-134a, HFC-152a, HFC-356mff, HFC-236ea, HFC-245ca, HFC-245fa, and HFC-365mcf), and the like. Among these, preferable are HCFC-141b, HFC-134a, HFC-356mff, HFC-236ea, HFC-245ca, HFC-245fa, and HFC-365mcf, and combinations of two or more of these.

The low boiling point hydrocarbons usually have a boiling point of −5 to 70° C., and examples include butane, pentane, cyclopentane, and mixtures thereof. When a usual rigid urethane foam is formed by a foaming method with a blowing agent, the compound (A2) is used as a polyol component. However, because the solubility of the low boiling point hydrocarbons to the compound (A2) is low, if the low boiling hydrocarbons are used as blowing agents, problems may result. For example, the expansion ratio of the obtained foam may be decreased, or the cells easily become non-uniform. On the other hand, in the present invention, a polyurethane foam is formed using the component (A), and the solubility of the low boiling point hydrocarbons to the component (A) is increased by using the compound (A1) as an essential component. Therefore, when the low boiling point hydrocarbons are used as the blowing agents (C1) in producing the foam [1] of the present invention, they can be used in large amounts because of their high solubility to the component (A), and moreover, the premix of the component (A) and the blowing agents has good stability. Therefore, it is free of problems such as that the expansion ratio of the foam may be decreased or non-uniform cells are easily formed, and thus is beneficial. When using a hydrogen atom-containing halogenated hydrocarbon compound as the blowing agent in producing the foam [1] of the present invention, the amount used is usually not more than 50 mass parts, preferably from 5 to 45 mass parts per 100 mass parts of the component (A). When using a low boiling point hydrocarbon as the blowing agent in producing the foam [1] of the present invention, the amount used is usually not more than 45 mass parts, preferably from 5 to 40 mass parts per 100 mass parts of the component (A). When using liquefied carbon dioxide gas as the blowing agent in producing the foam [1] of the present invention, the amount used is usually not more than 30 mass parts, preferably from 2 to 25 mass parts per 100 mass parts of the component (A). When using a combination of a hydrogen atom-containing halogenated hydrocarbon compound and water as the blowing agent in producing the foam [1] of the present invention, the amount of the hydrogen atom-containing halogenated hydrocarbon compound used is usually not more than 45 mass parts, preferably from 5 to 40 mass parts per 100 mass parts of the component (A), and the amount of the water used is usually not more than 10 mass parts, preferably from 0.5 to 8 mass parts per 100 mass parts of the component (A). When using a combination of a low boiling point hydrocarbon and water as the blowing agent in producing the foam [1] of the present invention, the amount of the low boiling point hydrocarbon used is usually not more than 40 mass parts, preferably from 2 to 35 mass parts per 100 mass parts of the component (A), and the amount of the water used is usually not more than 10 mass parts, preferably from 0.5 to 8 mass parts per 100 mass parts of the component (A). When using a combination of liquefied carbon dioxide gas and water as the blowing agent in producing the foam [1] of the present invention, the amount of the liquefied carbon dioxide gas used is usually not more than 25 mass parts, preferably from 0.1 to 20 mass parts per 100 mass parts of the component (A), and the amount of the water used is usually not more than 10 mass parts, preferably from 0.5 to 8 mass parts per 100 mass parts of the component (A). When using water alone as the blowing agent in producing the foam [1] of the present invention, the amount of the water used is usually from 0.1 to 30 mass parts, preferably from 1 to 20 mass parts per 100 mass parts of the component (A).

Examples of the additives (C2) as optional components are foam stabilizers (C21), urethanation catalysts (C22), inorganic powders (C23), hollow microspheres (C24), dehydrating agents (C25), staple fibers (C26), radical-polymerization initiators (C27), chain transfer agents (C28), dust-scattering reducers (C29), and the like. The use of these additives is at least partially different depending on the respective embodiments of foams blown with blowing agents, mechanical froth foam, and syntactic foam as described below. Other examples of the additives (C2) as optional components are polymerization inhibitors, organic lubricants (e.g. calcium stearate, ethylenediamine stearyl amide, oleic acid monoethanol amide, etc.), plasticizers (e.g. dioctyl phthalate, dioctyl adipate, etc.), thixotropy adding agents (e.g. particulate silica), ultraviolet ray absorbing agents, age resistants, antioxidants, colorants (dyes, pigments), flame retardants, antifungal agents, antibacterial agents, and the like.

The foam stabilizers (C21) may be any materials used in usual production of polyurethane foams, e.g. dimethyl siloxane-based foam stabilizer, polyether modified dimethyl siloxane-based foam stabilizer, phenyl methyl siloxane-based foam stabilizer, and the like. Examples of the foam stabilizers (C21) include "SH-193" and "SH-195" (produced by TORAY DOW CORNING SILICONE CO., Ltd.), "SZ-1627", "SZ-1931", "SZ-1923", and "SZ-1932" (produced by NIPPON UNICAR COMPANY LTD.", and the like. Among these preferable are "SZ-1931", "SZ-1923", and "SZ-1932". The amount of the foam stabilizer (C21) as an optional component is usually not more than 3%, preferably from 0.1 to 3%, particularly preferably from 0.2 to 2%, based on the total mass of the polyurethane foam-forming composition. For example, in the case of a mechanical froth foam, when using not less than 0.1% of a foam stabilizer (C21), the effects of finely dispersing and maintaining an inert gas, which is blown in during the production of the foam, is improved, so that a molded product with desired density and cell size is easily obtained. When using not more than 3% of a foam stabilizer (C21), bleed-out of the foam stabilizer onto the surface of the molded product is unlikely to occur.

Examples of the urethanation catalysts (C22) include amine-based catalysts (e.g. triethylenediamine, N-ethylmorpholine, diethylethanolamine, bis(dimethylaminoethyl) ether, N,N,N',N'-tetramethylhexamethylenediamine, 1-isobutyl-2-methylimidazole, 1,8-diazabicyclo-[5,4,0]-undecene-7, etc.), metal catalysts (e.g. stannous octylate, stannic dibutyl dilaurate, lead octylate, etc.), and the like. Preferable among these are triethylenediamine, bis(dimethylaminoethyl) ether, N,N,N',N'-tetramethylhexamethylenediamine, and stannic dibutyl dilaurate.

The amount of the urethanation catalyst (C22) as an optional component is usually not more than 5%, preferably from 0.001 to 3.5%, particularly preferably from 0.01 to 3% based on the total mass of the polyurethane foam-forming composition. When the amount of the catalyst is not less than 0.001%, the speed of the curing rises, and also the size of the cells in the molded product does not become large, and the texture of the molded product does not become coarse. The foam tends to have a finer texture as the amount of the catalyst increases. However, if the amount of the catalyst exceeds 5%, the speed of the curing may become too fast, and thus problems may be caused in the production of the foam.

The inorganic powders (C23) are used to increase the dimensional stability or mechanical strength of the molded product, or to provide flame resistance. The average particle size of the inorganic powder is preferably not more than 50 $\mu$m, particularly preferably not more than 10 $\mu$m when it is intended to improve the dimensional stability or mechanical strength. Examples of the inorganic powders (C23) include calcium carbonate, silica, kaoline, talc, aluminum hydroxide, calcium sulfate, barium sulfate, zinc white, titanium oxide, crushed stone, alumina, mica, fly ash, bentonite, ceramic powder, milled fiber, and the like. Preferable among these are calcium carbonate, aluminum hydroxide, silica, and talc.

Because the hollow microspheres (C24) have a cavity inside, they serve as a factor of forming foam layers, and also are used to lighten the weight and improve the processability of the molded product. Examples of such hollow microspheres (C24) include hollow microspheres comprising thermoplastic resins such as polyvinylidene chloride, polymethyl methacrylate, and polyacrylonitrile, hollow microspheres comprising thermosetting resins such as phenol resin, epoxy resin, and urea resin, microspheres comprising inorganic materials such as glass, alumina, shirasu, and carbon. Preferable among these are hollow microspheres comprising thermoplastic resins or thermosetting resins in view of their processability. The diameters of the hollow microspheres (C24) are usually from 10 to 200 $\mu$m on the average, and the bulk density is usually from 0.01 to 0.5. Examples of the hollow microspheres (C24) include "Matsumoto Microsphere F-80ED" and "MFL" series (produced by MATSUMOTO YUSHI-SEIYAKU CO., Ltd.", "phenolic microballoon BJO-0930" (produced by UNION CARBIDE), "Glass Bubbles K-15" and "Glass Bubbles K-37" (produced by Scotchlite), and the like.

The dehydrating agents (C25) are used when forming a mechanical froth foam or syntactic foam. They are used to prevent water or moisture from being mixed in the foam-forming composition and acting as a blowing agent in the urethanation reaction, so that a fine surface may be provided when the obtained molded product is processed by cutting. As the dehydrating agents (C25), common compounds having dehydrating effect may be used, but preferable are dehydrating agents which are neutral or alkaline and have a particle diameter of 0.1 to 50 $\mu$m. Examples of suitable dehydrating agents (C25) include calcium oxide, calcium sulfate (hemihydrate gypsum), calcium chloride, molecular sieve, and the like. Preferable among these are calcium sulfate (hemihydrate gypsum) and molecular sieve.

As the staple fibers (C26), conventional materials used for reinforcing thermosetting resins may be employed. The staple fibers (C26) have effects, for example, of improving the dimensional stability, bending strength, and bending modulus of the molded product. Furthermore, inorganic materials as the (C26) provide flame resistance. Examples of the materials of the staple fibers (C26) include fiber materials, for example, inorganic staple fibers (C261) such as glass fiber, ceramic fiber, carbon fiber, and rock wool; natural fibers; and synthetic fibers. Among these preferable is glass fiber in view of its effectiveness in reinforcing resins. The thickness of the staple fibers (C26) is preferably from 1 to 10,000 denier, particularly preferably from 10 to 2,000 denier. The length of the staple fibers (C26) is preferably from 0.1 to 50 mm, particularly preferably from 0.5 to 20 mm.

When compounds having a radical-polymerizable functional group are used as the compound (A1) and as needed as the compound (A0) to form the foam [1] of the present invention, these compounds can be brought into reaction in the presence of a radical-polymerization initiator (C27) as needed. Examples of the radical-polymerization initiator (C27) include common radical-polymerization initiators, for example, oil-soluble radical-polymerization initiators such as azo compounds [e.g. 2,2'-azobisisobutyronitrile, 2,2'-azobis-(2,4-dimethylvaleronitrile), 1,1'-azobis-(1-acetoxy-1-phenylethane), etc.], peroxides [e.g. dibenzoyl peroxide, benzoyl peroxide, dicumyl peroxide, t-butyl peroxy benzoate, etc.], and combinations of peroxides and dimethylaniline (redox catalysts), and water-soluble radical-polymerization initiators such as azobiscyano valeric acid, azobisamidinopropane salt, potassium persulfate, and combinations of sodium persulfate and sodium bisulfite (redox catalysts). Preferable among these are oil-soluble radical-polymerization initiators. The amount of the radical-polymerization initiator (C27) is preferably from 0.0001 to 10 mass parts, more preferably from 0.0005 to 1 mass parts per 100 mass parts of the total amount of the (A1) and the (A0) used as needed.

Furthermore, in the case of radical polymerization, a chain transfer agent (C28) may be used as needed. Examples of the (C28) include alkyl mercaptans (e.g. dodecyl mercaptan, mercaptoethanol, etc.), enol ethers described in Japanese Publication of Unexamined Patent Application (Tokkai) No. SHO 55-31880, and the like. Preferable among these are alkyl mercaptans. The amount of the chain transfer agent (C28) is preferably from 0.0001 to 10 mass parts, more preferably from 0.0005 to 1 mass parts per 100 mass parts of the total amount of the (A1) and the (A0) used as needed.

In the case of a rigid polyurethane foam that is processed by cutting, a dust-scattering reducer (C29) may be added as needed. Because a dust-scattering reducer (C29) contained in the foam inhibits the scattering in the air of dust generated when the foam is cut, it is preferable that the foam contains the (C29) when its density is low. Examples of the dust-scattering reducer (C29) include esterified materials and etherified materials in which the hydroxyl groups at both ends of a polyalkylene glycol are enclosed by a fatty acid or a higher alcohol. Examples of the polyalkylene glycols are homopolymers of EO or PO, and block or random copolymers comprising EO and PO. Preferable among these are homopolymer of EO and block copolymers comprising EO and PO. The molecular weight of the polyalkylene glycol is: in the case of polyethylene glycol (hereinafter abbreviated as PEG), usually from 200 to 1000, preferably from 200 to 600; in the case of polypropylene glycol (hereinafter abbreviated as PPG), usually from 200 to 4000, preferably from 200 to 1000; and in the case of a copolymer comprising EO and PO (hereinafter abbreviated as PEPG), usually from 400 to 5000, preferably from 1000 to 3000. Examples of the above-mentioned fatty acids include saturated or unsaturated fatty acids having 8 to 18 carbon atoms. Examples of the saturated fatty acids include caprylic acid, capric acid, lauric acid, myristic acid, palmitic acid, stearic acid, and the like. Examples of the unsaturated fatty acids include oleic acid, linoleic acid, linolenic acid, and the like. Preferable among these are lauric acid and oleic acid. Examples of the above-mentioned higher alcohol are saturated or unsaturated alcohols having 8 to 18 carbon atoms. Examples of the saturated alcohols include lauryl alcohol, myristyl alcohol, cetyl alcohol, stearyl alcohol, and the like. Examples of the unsaturated alcohols include oleyl alcohol and the like. Preferable among these are lauryl alcohol, stearyl alcohol, and oleyl alcohol. The dust-scattering reducers (C29) may be used either alone or in combination of two or more types. The (C29) may be a solid form, but it is desirable to be either a liquid or paste form at 20° C., so that its effect of inhibiting dust-scattering may be increased. A combination of two or more types of the dust-scattering reducers (C29), in which at least one in the combination is a liquid or paste form also may be employed. Among these dust-scattering reducers (C29) particularly preferable are dilauric acid ester and dioleic acid ester of PEG (molecular weight of 200 to 600).

One embodiment of the polyurethane foam [1] of the present invention is a rigid polyurethane foam [I] in which the component (A) satisfies the requirement that the M value expressed by the formula (2) below is not more than 500

$$M=J/(K+L \times 2-2) \qquad (2)$$

wherein J denotes the (number average) molecular weight of the component (A); K denotes the (average) number of the active hydrogen-containing group per molecule of the (A); and L denotes the (average) number of the addition-polymerizable functional group per molecule of the (A).

The M value of the (A) used in the foam [I] is preferably not more than 300, more preferably not more than 250, particularly preferably from 50 to 200. If the M value exceeds 500, the mechanical strength becomes low as a rigid foam.

As the compound (A2) that is used in the rigid polyurethane foam [I] as needed, those comprising at least one selected from polyether polyols, polyester polyols, polyhydric alcohols, and amines [e.g. diamines, polyamines, and alkanolamines] are preferably used. The value (on the average) of the active hydrogen-containing groups (hydroxyl value in the case of polyols) in the compound (A2) used in the foam [I] is preferably from 200 to 1000, more preferably from 250 to 700, particularly preferably from 300 to 650. In the case of the foam [I], when the value (on the average) of the active hydrogen-containing groups in the compound (A2) is not less than 200, the heat resistance and the strength of the obtained foam becomes high. When the value is not more than 1000, the molded product does not become too hard and brittle, and also scorch due to reaction heat may not be generated in the foam.

Furthermore, one embodiment of the rigid polyurethane foam [I] is a rigid polyurethane foam [Ia] having a density of 5 to 900 kg/m$^3$, which is formed using as auxiliaries (C) a blowing agent (C1) and as needed a foam stabilizer (C21) and/or an urethanation catalyst (C22) as additives (C2). The density of the foam [Ia] is preferably from 10 to 500 kg/m$^3$, particularly preferably from 20 to 200 kg/m$^3$.

By further using an inorganic powder (C23) and/or an inorganic staple fiber (C261) as additives (C2) in the foam [Ia], a flame-resistant rigid polyurethane foam can be obtained. The amount of the (C23) and/or the (C261) used to provide the foam with flame resistance is preferably from 9 to 40%, particularly preferably from 20 to 35% based on the total mass of the foam-forming composition. When the amount of the (C23) and/or the (C261) is not less than 9%, flame resistance is improved. When the amount is not more than 40%, the mechanical strength of the foam is not decreased.

Another embodiment of the foam [I] is a rigid polyurethane foam [Ib] which obtained by carrying out a polyurethane-forming reaction by a mechanical froth method without using as auxiliaries (C) a blowing agent (C1) but using inorganic powder (C23) and/or hollow microsphere (C24), a dehydrating agent (C25), and as needed a foam stabilizer (C21) and/or an urethanation catalyst (C22) as additives (C2).

In the mechanical froth foaming method, the inorganic powder (C23) and/or hollow microsphere (C24) serve as nucleating agents when an inert gas is made into fine bubbles and dispersed in the polyurethane foam-forming composition by mechanical stirring, and play a role in keeping the bubbles stabilized. The density of the foam [Ib] is usually from 100 to 1800 kg/m$^3$, preferably from 200 to 1200 kg/m$^3$, particularly preferably from 300 to 1000 kg/m$^3$.

Still another embodiment of the foam [I] is a rigid polyurethane foam [Ic] produced by forming a syntactic foam without using as auxiliaries (C) a blowing agent (C1) but using a hollow microsphere (C24), a dehydrating agent (C25), and as needed an inorganic powder (C23) as additives (C2).

The density of the foam [Ic] is usually from 100 to 1800 kg/m$^8$, preferably from 200 to 1200 kg/m$^3$, particularly preferably from 300 to 1000 kg/m$^3$.

The rigid polyurethane foams [Ib] and [Ic] have advantages in that they are of light weight and have an even density distribution, and exhibit a fine surface when cut, and that reduction in the mechanical properties is small when their density is decreased.

In the foams [Ib] and [Ic], the inorganic powder (C23) and hollow microsphere (C24) are used as fillers. The inorganic powder is useful to increase the dimensional stability and material strength of the foam and to improve the flame resistance. The hollow microsphere is useful for lightening the weight or improving the processability of the molded product. Therefore, the amounts should be chosen depending on the use of the foam. For example, to improve the strength or dimensional stability of the foam, the amount of the inorganic powder may be increased. And to obtain a molded product that has a low density and is easy to cut, the amount of the hollow microsphere may be increased. The amount of the filler comprising the inorganic powder (C23) and hollow microsphere (C24) is usually from 2 to 60%, particularly preferably from 5 to 40% based on the total mass of the foam-forming composition. When the amount of the filler is not less than 2%, the bubbles generated in the mechanical froth foaming method are sufficiently maintained. When the amount of the filler is not more than 50%, the viscosity of the foam-forming composition does not become too high, so that production become easy.

In the foams [Ib] and [Ic], because the dehydrating agent (C25) is added to prevent blowing caused by moisture in the foam-forming composition, e.g. moisture in the fillers, during the urethanation reaction, its amount should be adjusted depending on the content of the moisture in the composition. It is also necessary to increase the amount of the dehydrating agent (C25) when the amount of the fillers is large. The amount of the dehydrating agent (C25) is usually from 0.5 to 8%, preferably from 0.8 to 6% based on the total mass of the foam-forming composition. When the amount of the dehydrating agent is not less than 0.5%, blowing is not caused by the absorbed moisture during the curing reaction, so that the obtained molded product exhibits a fine texture. Furthermore, when the amount of the dehydrating agents is not more than 8%, the molded product has good cutting workability.

In the foams [Ib] and [Ic], a dust-scattering reducer (C29) may be optionally added. The (C29) reduces the amount of the dust scattering when the molded product is cut. There is a tendency that the amount of the scattering dust increases as the density of the molded product decreases. Therefore, when the molded product has a low density, it is desirable that the (C29) is contained in a relatively large amount. The amount of the (C29) is usually from 3 to 30%, preferably from 5 to 20% based on the total mass of the foam-forming composition. When the amount of the (C29) is not less than 3%, the amount of the scattering dust decreases sufficiently. When the amount is not more than 30%, hardness and heat resistance of the molded product are not affected.

The foams [Ib] and [Ic] can be processed by cutting into desired shapes to produce cut moldings. The methods of the cutting include hand working using chisel, saw, plane or the like, and machine working using a CNC machine or the like.

The foams [Ia] to [Ic] may be rigid polyurethane foams that further contain staple fiber (C26) as an additive (C2). By using the staple fiber (C26), a rigid foam with high bending strength and high bending modulus can be obtained.

Particularly, because in the present invention the component (A) contains the compound (A1) and as needed the compound (A0), which reduce the viscosity of the composition, a staple fiber-reinforced foam having stronger mechanical strength may be produced by increasing the content of the staple fiber than in a conventional case. For example, when producing a mechanical froth foam [Ib], even if the amount of the staple fiber used in the composition is increased, the viscosity of the composition does not become as high as in a conventional case. Thus, mechanical stirring can be conducted sufficiently, so that inert gas is uniformly dispersed. Therefore, the obtained foam has high mechanical strength. Accordingly, a mechanical froth foam that can be applied to repeated uses such as materials of molds or to uses subject to a bending stress can be provided. When the foam is reinforced with staple fiber, the amount of the staple fiber (C26) is usually not more than 50 mass %, preferably from 10 to 50 mass %, particularly preferably from 20 to 40 mass % based on the total mass of the foam-forming composition. When the amount of the (C26) is not less than 10 mass %, its effect of reinforcing the resin is increased. When the amount is not more than 50 mass %, defects are not generated in the foam and a homogeneous foam can be obtained. Furthermore, when the foams [Ib] and [Ic] are reinforced with staple fiber, in order not to make the viscosity of the composition too high, the total amount of the staple fiber (C26), inorganic powder (C23), and hollow microsphere (C24) is usually not more than 60 mass %, preferably from 10 to 60 mass %, particularly from 20 to 50 mass % based on the total mass of the foam-forming composition. When the staple fiber (C26) is contained in the foams [Ib] and [Ic] as their components, staple fiber-reinforced rigid polyurethane foams, which have an even density distribution, which are of light weight and excellent in dimensional stability, and which exhibit fine surfaces when cut, and have high bending strength and high bending modulus, can be obtained.

Because the rigid polyurethane foam [I] has high strength, good thermal insulation and flame resistance, and particularly excellent dimensional stability, it can be used in a wide range of applications utilizing these characteristics. The uses of the rigid polyurethane foam [I] include refrigerators, freezers, thermal insulators for construction etc., shock-absorbing materials, synthetic woods (including for structural materials, materials for models, etc.), and the like.

Another embodiment of the polyurethane foam [1] of the present invention is a flexible polyurethane foam [II] that has a density of 10 to 500 kg/m$^3$ and in which the component (A) satisfies the requirement that the M value expressed by the above formula (2) is at least 500.

The M value of the component (A) used in the foam [II] is preferably at least 800, more preferably at least 1,000, particularly preferably from 1,100 to 15,000. If the M value is less than 500, the flexibility becomes inadequate as a flexible foam. Furthermore, the density of the foam [II] is preferably from 15 to 200 kg/m³, particularly preferably from 20 to 100 kg/m³.

The value (on the average) of the active hydrogen-containing groups (hydroxyl value in the case of polyols) in the compound (A2) used in the foam [II] as needed is preferably from 4 to 200, more preferably from 10 to 150, particularly preferably from 15 to 120. When the value (on the average) of the active hydrogen-containing groups is within the above-mentioned range, a foam that has flexibility and in which the compression set is small enough can be obtained. Moreover, those preferable as the compound (A2) are the same as in the case of the foam [I].

One embodiment of the flexible polyurethane foam [II] is a flexible polyurethane foam that is formed using as auxiliaries (C) a blowing agent (C1) and as needed a foam stabilizer (C21) and/or an urethanation catalyst (C22) as additives (C2). Moreover, by further using inorganic powder (C23) and/or inorganic staple fiber (C261) as additives (C2), a flame-resistant flexible polyurethane foam can be obtained. The amounts of the (C23) and/or the (C261) used are the same as in the case of the above-mentioned foam [Ia].

The flexible polyurethane foam [II] is advantageous because it has good hardness so that its density may be lowered, and also it has small compression set. Therefore, it can be used in a wide variety of applications utilizing these characteristics. The flexible polyurethane foam [II] can be used as a cushioning material, shock-absorbing material, sound insulating/absorbing material, etc.

One example of the method for producing the polyurethane foam [Ia] by blowing with a blowing agent according to the present invention is as follows: First, a component (A), a blowing agent (C1), and as needed at least one additive (C2) are mixed in predetermined amounts. Then, using a polyurethane foaming machine or an agitator, the mixture is mixed with an organic polyisocyanate (B) rapidly. The obtained mixture solution (a foam base solution) is poured into a mold. After curing for a predetermined period, it is removed from the mold to obtain a polyurethane foam.

Furthermore, a polyurethane foam can be obtained by spray foaming or continuous foaming. Moreover, in a prepolymer method, the viscosity of the foam base solution in which individual components are mixed becomes high in the urethanation reaction. Therefore, a one shot process is preferably employed.

Moreover, the NCO index (equivalent number of isocyanate group per one equivalent of active hydrogen-containing group×100) when producing the foam [Ia] is preferably from 40 to 500, particularly preferably from 60 to 250. If the NCO index is less than 40, the calorific value become low during the blowing. Thus, the expansion ratio may become small, the mechanical strength of the foam may be decreased, or the dimensional stability of the foam may be deteriorated. On the other hand, if the NCO index is more than 500, the foam may become brittle. Moreover, in a common process of forming a polyurethane foam, only the compound (A2) is employed as the polyol component, and the NCO index is usually at least 80. This is because, if the NCO index is decreased, mechanical strength is reduced, or dimensional stability is deteriorated. In the process of the present invention, however, because of the use of the self-polymerizable compound (A1), even when the NCO index is small, the crosslinking density becomes higher than in common urethane foams, and the decrease in the mechanical strength of the foam is small. Thus, even when only water is used as a blowing agent, if the NCO index is decreased, the amount of the organic isocyanate with respect to the polyol does not become large, so that a mixing deficiency is unlikely to occur during the blowing.

One example of the process for forming the mechanical froth foam [Ib] or syntactic foam [Ic] of the present invention is as follows: A foam-forming composition is usually produced by preparing two components separately, i.e. a component comprising the component (A) (hereinafter referred to as an active hydrogen component in the description of this process) and a component comprising the organic polyisocyanate (B) (hereinafter referred to as the NCO component in the description of this process). The active hydrogen component and the NCO component are prepared by mixing respective raw materials using a mixing vessel having a mixing blade such as of a propeller or paddle type, or using a planetary mixer, Hobart mixer, or the like. In the foams [Ib] and [Ic], fillers such as inorganic powder and hollow microsphere, dehydrating agents, dust-scattering reducers, foam stabilizers, urethanation catalysts, and the like are usually contained in the active hydrogen component, but they also may be contained in the NCO component. Particularly, when a large amount of fillers is contained, it is preferable that a portion of the fillers is contained in the NCO component. In such a case, by adding a dehydrating agent in the NCO component depending on the content of the fillers in the NCO component, deterioration with age (increased viscosity) of the NCO component can be prevented. Materials such as colorants or catalysts that are used in small amounts may be added preliminarily to the active hydrogen component, but they also may be added into the mixing machine at the same time when the active hydrogen component and the NCO component are mixed and molded through curing. The foams [Ib] and [Ic] are obtained by causing reaction in a composition comprising the active hydrogen component and the NCO component to polymerize the addition-polymerizable functional group and simultaneously form a polyurethane in the absence of a blowing agent.

Furthermore, when producing the foams [Ib] and [Ic], the NCO index is preferably from 40 to 500, more preferably from 60 to 250, particularly preferably from 85 to 120. If the NCO index is less than 40, the mechanical strength of the foams may be decreased, or the coefficient of linear expansion may be increased. On the other hand, if the NCO index is more than 500, the foams may become hard and brittle.

The process for producing the mechanical froth foam [Ib] in which an inert gas is mixed and the process for producing the syntactic foam [Ic] in which an inert gas is not mixed according to the present invention are, for example, the procedures as follows, respectively.

In the process in which an inert gas is mixed:
(1) An active hydrogen component and a NCO component are prepared according to the above-mentioned processes.
(2) The active hydrogen component, the NCO component, and an inert gas are mixed uniformly in a certain ratio, and the mixture liquid is poured into a mold.
(3) After curing the mixture liquid in the mold, it is removed from the mold to obtain a mechanical froth foam [Ib].

In this process, it is preferable to use, for example, a mechanical froth method, i.e. a method in which a mixer with a high shearing force such as an Oakes mixer is used, to mix the active hydrogen component, the NCO component, and the inert gas uniformly. The mechanical froth method is suitable for continuously mixing a gas into a liquid ingredient.

Examples of the inert gas mixed are those that will not react with the active hydrogen component or with the NCO component, and that are not in a liquid state under the atmospheric pressure at a temperature of −30° C. Preferable are air, nitrogen, and carbon dioxide gas. The amount of the inert gas mixed is usually from 10 to 70%, preferably from 20 to 60% based on the total volume of the inert gas and the entire composition.

In the process in which an inert gas is not mixed:
(1) An active hydrogen component and a NCO component are prepared according to the above-mentioned processes.
(2) The active hydrogen component and the NCO component are mixed uniformly in a certain ratio, and the mixture liquid is poured into a mold.
(3) Defoaming under a reduced pressure is performed, and the bubbles contained in the mixture liquid in the mold are removed.
(4) After curing the mixture liquid in the mold, it is removed from the mold to obtain a syntactic foam [Ic].

In this process, the mixing is performed by stirring with a mixing blade such as a propeller type, flat blade type, curved blade type, Pfaudler type, paddle type, or the like in a mixing vessel, or by using a mixing machine such as a screw type, kneader type, universal type, etc. Usually, a mixing machine of either screw or kneader type is employed.

The polyurethane foam [2] of the present invention is an elastic polyurethane foam obtained by reacting an addition-polymerizable active hydrogen component (A') mentioned below with an organic polyisocyanate (B) in the presence or absence of at least one auxiliary (C) selected from the group consisting of blowing agents (C1) and additives (C2) to polymerize the addition-polymerizable functional group and simultaneously form a polyurethane.

Addition-polymerizable active hydrogen component (A'): an addition-polymerizable active hydrogen component, which comprises an active hydrogen-containing group (w) and an addition-polymerizable functional group (x), and which is selected from the (A31), (A32), and (A33) below; wherein the reaction rate constant K1 between the active hydrogen-containing group (w) and an isocyanate group (z) at 120° C is not more than 1 (liter/mol/sec); polymerization reaction rate constant K2 of the addition-polymerizable functional group (x) is not less than 10 (liter/mol/sec); and K2/K1 is not less than 100.

(A31): an addition-polymerizable active hydrogen compound that has an active hydrogen-containing group (w) and an addition-polymerizable functional group (x), and which may have a cyclic group (y) reactive with the group (w).
(A32): an active hydrogen compound (A321) having at least three groups (w) or having the groups (w) and (y), and an addition-polymerizable compound (A322) having the groups (x) and (y), used in combination.
(A33): the compound (A31), and the compound (A321) and/or the compound (A322), used in combination.

In producing the foam [2] of the present invention, the addition polymerization of the addition-polymerizable functional group (x) and the urethanation reaction between the isocyanate group in the organic polyisocyanate (B) and the active hydrogen-containing group (w) are carried out in the same reaction system. Moreover, in the present invention, it is understood that to polymerize the addition-polymerizable functional group and simultaneously form a polyurethane means that the polymerization of the addition-polymerizable functional group and the polyurethane-forming reaction are carried out simultaneously at least partially during the reaction period. In order to improve the mechanical properties with increased crosslinking density, it is preferable that the other reaction is initiated before a resin is formed through curing in one reaction, so that the two reactions are carried out at the same time.

The active hydrogen-containing group (w) used in the foam [2] of the present invention has a reaction rate constant K1 between the group (w) and isocyanate group of not more than 1 (liter/mol/sec) at 120° C. Examples of such an active hydrogen-containing group (w) are hydroxyl, mercapto, carboxyl, primary amino, and secondary amino groups, and the like. Preferable among these are hydroxyl or mercapto group, particularly preferably hydroxyl group.

As the addition-polymerizable functional group (x) used in the present invention, an addition-polymerizable functional group which has a polymerization reaction rate constant K2 of not less than 10 (liter/mol/sec) at 120° C., K2/K1 being not less than 100, may be employed. Examples of such an addition-polymerizable functional group (x) are radical-polymerizable groups, cationic-polymerizable groups, and anionic-polymerizable groups. Preferable among these are radical-polymerizable groups.

Examples of the radical-polymerizable groups include acryloyl, methacryloyl, vinyl ester, vinylbenzyl, vinylphenyl, vinylidene, and allyl ether groups, and the like. Preferable among these are acryloyl or methacryloyl group. Examples of the cationic-polymerizable groups include vinyl ether group, propenyl ether group, and the like. Examples of the anionic-polymerizable groups include vinylcarboxyl group, cyanoacryloyl group, and the like. Examples of the cyclic group (y) reactive with the group (w) include epoxy group, anhydrous maleyl group, and the like. Preferable among these is an epoxy group.

The number of the active hydrogen-containing groups (w) in the above-mentioned addition-polymerizable active hydrogen compound (A31) is usually from 1 to 10, preferably from 2 to 5. Furthermore, the number of the addition-polymerizable functional groups (x) in the compound (A31) is usually from 1 to 10, preferably from 1 to 5. Furthermore, the number of the cyclic groups (y) in the compound (A31) is usually 0 or from 1 to 5, preferably from 0 to 2.

Examples of a compound (A311) having an active hydrogen-containing group (w) and addition-polymerizable functional group (x) in one molecule among the compounds (A31) include the same compounds as the compound (A1) used in the above-mentioned foam [1].

Examples of a compound (A312) having the groups (w), (x), and (y) in one molecule among the compounds (A31) include partially glycidyl-etherified partial esters of unsaturated carboxylic acids with polyols. Examples of the partial esters of unsaturated carboxylic acids with polyols include the same compounds as the compound (A1/1) used in the above-mentioned foam [1]. The partially glycidyl-etherified materials mentioned above as examples of the compound (A312) are obtained by partial esterification and partial glycidyl-etherification of polyols, which are performed either sequentially or simultaneously, using unsaturated carboxylic acids and epichlorohydrin.

It is preferable that the relationship between the (number average) molecular weight W and the total number F of the groups (w), (x) and (y) in one molecule is W/F>-1000 in the compound (A31), so that the elasticity of the urethane foam is easily maintained when the amount of the (A31) used is increased. It is particularly preferable that W/F is from 1200 to 5000.

A compound (A321) is either a compound (A321/0) having at least three groups (w) and not having the group (y), or an active hydrogen compound having the groups (w) and (y). The number of the group (w) in the (A321/0) is usually from 3 to 10, preferably from 3 to 6. Moreover, in the compounds (A321) other than the (A321/0), the number of the group (w) is usually from 1 to 10, preferably from 2 to 6, and the number of the group (y) is usually from 1 to 5, preferably from 1 to 2. The group (y) reacts with the group (w) contained in the compound (A31) or (A32) rapidly to form a bond therebetween as well as to form a new active hydrogen-containing group (w'). Therefore, in the case of the active hydrogen compound having the groups (w) and (y), the number of the group (w) may be from 1 to 10 but in the case of the compound (A321/0) not having the group (y), it is necessary that the number of the group (w) is from 3 to 10.

The compound (A321/0) among the compounds (A321) may be at least one selected from known polyether polyols, polyester polyols, polyhydric alcohols, and amines [polyamines and alkanolamines] commonly used in polyurethane foams as listed above in the description of the foam [1], in which the number of the active hydrogen-containing groups is within the above-mentioned range.

Examples of an active hydrogen compound having the groups (w) and (y) among the compounds (A321) include the (A321/1) to (A321/4) as follows:

(A321/1) Partially glycidyl-etherified polyols (A321/2) Partially glycidyl-thioetherified polythiols (A321/3) Epoxides having hydroxyl groups (A321/4) Substituted maleic anhydrides having hydroxyl groups The compounds (A321/1) can be obtained by reacting the above-mentioned polyols with compounds containing epoxy groups such as glycidol or epichlorohydrin.

The compounds (A321/2) can be obtained by reacting the above-mentioned polythiols with compounds containing epoxy groups such as glycidol or epichlorohydrin.

Examples of the compounds (A321/3) include glycidol and the like.

Examples of the compounds (A321/4) include hydroxyethyl maleic anhydride and the like.

In the present invention, a vinyl polymer (F) may be dispersed in the compound (A321) as needed. The polymer (F) may be dispersed in the compound (A321) after it is polymerized, but preferably it is dispersed and stabilized by polymerizing a vinyl-based monomer (f) in the (A321). Examples of the monomer (i) include acrylonitrile, styrene, vinylidene chloride, alkyl (meth)acrylate, and the like. Preferable among these are acrylonitrile and styrene. The amount of the polymer (F) is usually from 5 to 50 mass parts, preferably from 15 to 45 mass parts per 100 mass parts of the compound (A321).

The compound (A322) is an addition-polymerizable compound having an addition-polymerizable functional group (x) and a cyclic group (y). The number of the group (x) in the compound (A322) is usually from 1 to 10, preferably from 1 to 5. Furthermore, the number of the cyclic group (y) in the compound (A322) is usually from 1 to 5, preferably from 1 to 2.

Examples of the compound (A322) include glycidyl acrylate, glycidyl methacrylate, maleic anhydride, and the like. The groups (y) in the compound (A322) are suitable for increasing the reaction rate because they react with the groups (w) contained in the compound (A31) or (A32) rapidly to form a bond therebetween as well as to form a new active hydrogen-containing group (w'). However, because the group (w') has a large steric hindrance, unreacted active hydrogen-containing groups may remain, or its ring may open independently by reacting with water due to the effect of an amine catalyst, which may be used as a catalyst of urethanation reaction, and deteriorates the properties of the foam without contributing to the crosslinking. Therefore, it is preferable that the addition-polymerizable active hydrogen component (A') comprises the addition-polymerizable active hydrogen compound (A31) or comprises the compound (A31) and the active hydrogen compound (A321).

When the component (A') comprises the above-mentioned (A31) or (A33), it is preferable that the (A31) is from 1 to 100 mass %, the (A321) is from 0 to 99 mass %, and the (A322) is from 0 to 50 mass % based on the total mass of the (A31), (A321) and (A322). It is particularly preferable that the (A31) is from 5 to 100 mass %, the (A321) is from 0 to 95 mass %, and the (A322) is from 0 to 30 mass %.

When the component (A') comprises the above-mentioned (A32), it is preferable that the (A321) is from 50 to 99 mass %, and the (A322) is from 1 to 50 mass % based on the total mass of the (A321) and (A322). It is particularly preferable that the (A321) is from 70 to 98 mass % and the (A322) is from 2 to 30 mass %.

In the present invention, an elastic urethane foam that is produced by reacting a component comprising the compound (A31) used as the component (A') [including the case in which a compound other than the (A31) is also contained] and a polyisocyanate component as essential components has a M' value expressed by the formula below of usually at least 500, preferably at least 800, more preferably at least 1000, particularly preferably from 1,100 to 15,000:

$$M' \text{ value} = J'/(K'+L' \times 2-2)$$

wherein J' denotes the (number average) molecular weight of the addition-polymerizable active hydrogen component comprising the compound (A31), K' denotes the (average) number of the group (w) per molecule, and L' denotes the (average) number of the group (x) per molecule.

If the M' value is less than 500, the flexibility of the elastic polyurethane foam is reduced.

Examples of the organic polyisocyanate (B) used in the foam [2] of the present invention include the same compounds as in the above-mentioned foam [1], and those preferable are also the same as in the above-mentioned foam [1].

When producing the foam [2] of the present invention, in the case of using a compound having a radical-polymerizable unsaturated group as the addition-polymerizable functional group, reaction can be carried out in the presence or absence of a radical-polymerization initiator or a chain transfer agent as in the process for producing the foam [1]. Also, the types of the radical-polymerization initiator or the chain transfer agent that may be employed, their amounts used, or those preferable are the same as in the process for producing the foam [1].

At least one selected from the group consisting of water, hydrogen atom-containing halogenated hydrocarbon, low boiling point hydrocarbon, and carbon dioxide may be used as a blowing agent as needed. In terms of preventing harmful effects to the earth environment and maintaining the working environment, water or carbon dioxide is preferably used. There has been a conventional problem that hardness is more difficult to develop when using carbon dioxide as a blowing agent than when using water. However, because hardness can be improved in the present invention, carbon dioxide also may be preferably employed as a blowing agent.

In the same way as in the process for producing the foam [1], urethanation catalysts and foam stabilizers may be used as needed, and the types and the amounts used thereof are also the same.

Furthermore, in the same way as in the foam [1], various known additives and auxiliaries, e.g. surfactants such as emulsifiers and foam stabilizers, age resistors such as antioxidants and ultraviolet ray absorbing agents, inorganic powders such as calcium carbonate and barium sulfate, staple fibers such as glass fiber, carbon fiber, and potassium titanate whisker, flame retardants, plasticizers, polymerization inhibitors, colorants, antibacterial agents, antifungal agent, and the like may be used as needed.

One example of the process for producing the polyurethane foam [2] of the present invention is as follows: First, an addition-polymerizable active hydrogen component (A') is mixed with a blowing agent, foam stabilizer, catalyst, radical-polymerization initiator, and other additives in predetermined amounts as needed. Then, using a polyurethane foaming machine or an agitator, this mixture is admixed with an organic polyisocyanate (B) rapidly. The obtained mixture solution (foam base solution) is poured into a mold, and after curing for a predetermined period, it is removed from the mold to obtain a polyurethane foam. Furthermore, a polyurethane foam may be obtained by spray foaming or continuous foaming. Moreover, in a prepolymer method, the viscosity of the foam base solution in which individual components are mixed becomes high in the urethanation reaction. Therefore, a one shot process is preferably employed. Furthermore, the polyurethane foam also may be obtained by a mechanical froth method without using a blowing agent.

Moreover, the NCO index in the case of producing the foam [2] is preferably from 40 to 500, particularly preferably from 60 to 250. If the NCO index is less than 40, the expansion ratio may become small due to the small calorific value during the blowing, or the mechanical strength of the foam may be decreased. On the other hand, if the NCO index exceeds 500, the foam may become brittle.

The polyurethane foam [2] of the present invention can be used as a cushioning material, shock-absorbing material, sound insulating/absorbing material, etc.

BEST MODES FOR CARRYING OUT THE INVENTION

The present invention will be further described by referring to the following non-limiting Examples and Comparative Examples.

In the following Examples and Comparative Examples, the "part" means "mass part" unless specified otherwise.
Evaluations of the Polyurethane Foams [Ia] and [II]

PRODUCTION EXAMPLE 1

Production of Glycerol Monoacrylate

Using 0.3 g (0.003 mole) of sulfuric acid as a catalyst, 72 g (1 mole) of acrylic acid was reacted with 92 g (1 mole) of glycerol. The reaction mixture was neutralized with 0.34 g (0.006 mole) of potassium hydroxide, and 0.15 g (0.1 mass %) of hydroquinon was added as a stabilizer. Thus, glycerol monoacrylate (A1—1) was obtained.

PRODUCTION EXAMPLE 2

Production of Glycerol Diacrylate

Using 0.6 g (0.006 mole) of sulfuric acid as a catalyst, 144 g (2 moles) of acrylic acid was reacted with 92 g (1 mole) of glycerol. The reaction mixture was neutralized with 0.68 g (0.012 mole) of potassium hydroxide, and 0.20 g (0.1 mass %) of hydroquinon was added as a stabilizer. Thus, glycerol diacrylate (A1–2) was obtained.

PRODUCTION EXAMPLE 3

Production of Pentaerythritol PO 4-molar Adduct Triacrylate)

Using 0.9 g (0.009 mole) of sulfuric acid as a catalyst, 216 g (3 moles) of acrylic acid was reacted with 368 g (1 mole) of a polyol (hydroxyl value of 610) in which 4 moles of PO was added to 1 mole of pentaerythritol. The reaction mixture was neutralized with 1.01 g (0.018 mole) of potassium hydroxide, and 0.53 g (0.1 mass %) of hydroquinon was added as a stabilizer. Thus, pentaerythritol PO 4-molar adduct triacrylate (A1–3) was obtained.

PRODUCTION EXAMPLE 4

Production of Sorbitol EO 6-molar Adduct Tetraacrylate)

Using 1.2 g (0.012 mole) of sulfuric acid as a catalyst, 288 g (4 moles) of acrylic acid was reacted with 446 g (1 mole) of a polyol (hydroxyl value of 755) in which 6 moles of EO was added to 1 mole of sorbitol. The reaction mixture was neutralized with 1.35 g (0.024 mole) of potassium hydroxide, and 0.60 g (0.1 mass %) of hydroquinon was added as a stabilizer. Thus, sorbitol EO 6-molar adduct tetraacrylate (A1–4) was obtained.

PRODUCTION EXAMPLE 5

Production of Diethylene Glycol Monoacrylate

Using 0.3 g (0.003 mole) of sulfuric acid as a catalyst, 72 g (1 mole) of acrylic acid was reacted with 106 g (1 mole) of diethylene glycol. The reaction mixture was neutralized with 0.34 g (0.006 mole) of potassium hydroxide, and 0.16 g (0.1 mass %) of hydroquinon was added as a stabilizer. Thus, diethylene glycol monoacrylate (A1–5) was obtained.

EXAMPLE 1

Production of a Rigid Urethane Foam by Blowing with Water Alone 100 parts of glycerol monoacrylate (Al-1), 1.5 parts of "SILICONE SH-193" (a silicone-based foam stabilizer produced by TORAY DOW CORNING SILICONE CO., Ltd.), 7 parts of water, 10 parts of "FYROL CEF" (organic phosphorus-based flame retardant produced by AKZO JAPAN CO., Ltd.), and 2.0 parts of "Ucat-1000" (a N,N, N',N'-tetramethylhexamethylenediamine-based amine catalyst produced by SAN APRO CO., Ltd.) were mixed, and controlled at a temperature of 25° C. To this mixture liquid, 203.7 parts of crude MDI (NCO index of 70) controlled at 25° C. was added and stirred by "Homodisper" (an agitator manufactured by TOKUSHU KIKA INDUSTRIES Ltd.) at 4000 rpm for 10 seconds. Then, it was poured into an aluminum mold of 1000 mm (length)×100 mm (width)×50 mm (height) controlled at 60° C. After 10 minutes, it was removed from the mold to obtain a rigid polyurethane foam.

EXAMPLE 2

Production of a Rigid Urethane Foam by Blowing with a Low Boiling Point Hydrocarbon and Water Used in Combination 30 parts of diethylene glycol monoacrylate (Al-5) was mixed with 70 parts of a polyol (A2–1) obtained by adding PO (4.55 mole) to pentaerythritol (1 mole). The mixture was further admixed with 3.0 parts of "SILICONE SH-193", 2 parts of water, 18 parts of cyclopentane, 10 parts of "FYROL CEF", 0.01 part of t-butylperoxybenzoate, and 2 parts of "Ucat-1000", and controlled at a temperature of 25° C. To this mixture liquid, 150.3 parts of crude MDI (NCO index of 100) controlled at 25° C. was added, and the same procedures as in Example 1 were carried out. Thus, a rigid polyurethane foam was obtained.

EXAMPLE 3

Production of a Rigid Urethane Foam by Blowing with Water Alone 100 parts of sorbitol EO 6-molar adduct tetraacrylate (A1–4), 1.5 parts of "SILICONE SH-193", 7 parts of water, 10 parts of "FYROL CEF", and 2 parts of "Ucat-1000" were mixed, and controlled at a temperature of 25° C. To this mixture liquid, 146.3 parts of crude MDI (NCO index of 100) controlled at 25° C. was added, and the same procedures as in Example 1 were carried out. Thus, a rigid polyurethane foam was obtained.

EXAMPLE 4

Production of a Rigid Urethane Foam by Blowing with Water Alone 50 parts of pentaerythritol PO 4-molar adduct triacrylate (A1–3) was mixed with 50 parts of a polyol (A2–1) obtained by adding PO (4.55 moles) to pentaerythritol (1 mole). The mixture was further admixed with 1.5 parts of "SILICONE SH-193", 7 parts of water, 10 parts of "FYROL CEF", 0.01 part of t-butylperoxybenzoate, and 2 parts of "Ucat-1000", and controlled at a temperature of 25° C. To this mixture liquid, 167.3 parts of crude MDI (NCO index of 90) controlled at 25° C. was added, and the same procedures as in Example 1 were carried out. Thus, a rigid polyurethane foam was obtained.

EXAMPLE 5

Production of a Rigid Urethane Foam by Blowing with Substitute for Freon and Water Used in Combination 80 parts of glycerol diacrylate (A1–2) was mixed with 20 parts of a polyol (A2—2) obtained by adding PO (2.7 moles) to glycerol (1 mole). The mixture was further admixed with 1.5 parts of "SILICONE SH-193", 2 parts of water, 25 parts of "HCFC-141b", 10 parts of "FYROL CEF", 0.01 part of t-butylperoxybenzoate, and 2 parts of "Ucat-1000", and controlled at a temperature of 25° C. To this mixture liquid, 116.8 parts of crude MDI (NCO index of 100) controlled at 25° C. was added, and the same procedures as in Example 1 were carried out. Thus, a rigid polyurethane foam was obtained.

EXAMPLE 6

Production of a Rigid Urethane Foam by Blowing with Liquefied Carbon Dioxide Gas and Water Used in Combination 50 parts of glycerol diacrylate (A1–2) was mixed with 50 parts of a polyol (A2–1) obtained by adding PO (4.55 moles) to pentaerythritol (1 mole). The mixture was further admixed with 1.5 parts of "SILICONE SH-193", 2 parts of water, 10 parts of "FYROL CEF", and 2 parts of "Ucat-1000". The mixture liquid was put into a raw material tank of a high-pressure foaming machine. In the mixture liquid, 18 parts of liquefied carbon dioxide gas was injected and mixed at a back pressure of 1 MPa of the tank, and it was controlled at a temperature of 25° C. This was mixed with 131.7 parts of crude MDI (NCO index of 100) controlled at a temperature of 25° C. by colliding at 15 MPa, and poured into an aluminum mold of 1000 mm (length)×100 mm (width)×50 mm (height) controlled at 60° C. After 10 minutes, it was removed from the mold to obtain a rigid polyurethane foam.

EXAMPLE 7

Production of a Rigid Urethane Foam by Blowing with Substitute for Freon and Water Used in Combination 30 parts of diethylene glycol monoacrylate (A1–5) was mixed with 70 parts of a polyol (A2–1) obtained by adding PO (4.55 moles) to pentaerythritol (1 mole). The mixture was further admixed with 1.5 parts of "SILICONE SH-193", 1.5 parts of water, 25 parts of "HCFC-141b", 10 parts of "FYROL CEF", and 2 parts of "Ucat-1000", and controlled at a temperature of 25° C. To the mixture liquid, 150.3 parts of crude MDI (NCO index of 100) controlled at 25° C. was added, and the same procedures as in Example 1 were carried out. Thus, a rigid polyurethane foam was obtained.

EXAMPLE 8

Production of a Rigid Urethane Foam by Blowing with a Low Boiling Point Hydrocarbon and Water Used in Combination 70 parts of diethylene glycol monoacrylate (A1–5), 30 parts of diethylene glycol diacrylate (A0–1), 3.0 parts of "SILICONE SH-193", 2 parts of water, 18 parts of cyclopentane, 10 parts of "FYROL CEF", 0.01 part of t-butylperoxybenzoate, and 2 parts of "Ucat-1000" were mixed, and controlled at a temperature of 25° C. To this mixture liquid, 89.4 parts of crude MDI (NCO index of 100) controlled at 25° C. was added, and the same procedures as in Example 1 were carried out. Thus, a rigid polyurethane foam was obtained.

EXAMPLE 9

Production of a Rigid Urethane Foam by Blowing with Water Alone 30 parts of glycerol monoacrylate (A1—1), 70 parts of pentaerythritol PO 4-molar adduct triacrylate (A1–3), 1.5 parts of "SILICONE SH-193", 7 parts of water, 10 parts of "FYROL CEF", 0.01 part of t-butylperoxybenzoate, and 2 parts of "Ucat-1000" were mixed, and controlled at a temperature of 25° C. To this mixture liquid, 125.3 parts of crude MDI (NCO index of 70) controlled at 25° C. was added, and the same procedures as in Example 1 were carried out. Thus, a rigid polyurethane foam was obtained.

EXAMPLE 10

Production of a Flame-resistant Rigid Urethane Foam 100 parts of glycerol diacrylate (A1–2), 80 parts of aluminum hydroxide (produced by NIPPON LIGHT METAL CO., Ltd.), 2.5 parts of "SILICONE SH-193", 9 parts of water, 10 parts of "FYROL CEF", and 2 parts of "Ucat-1000" were mixed, and controlled at a temperature of 25° C. To this mixture liquid, 203.2 parts of crude MDI (NCO index of 100) controlled at 25° C. was added, and the same procedures as in Example 1 were carried out. Thus, a flame-resistant rigid polyurethane foam was obtained.

EXAMPLE 11

Production of a Flexible Urethane Foam by Blowing with Water Alone 3 parts of glycerol monoacrylate (A1—1), 60 parts of a polyol (A2–3) obtained by adding PO (73 moles) and further EO (16 moles) to glycerol (1 mole), 40 parts of a polymer polyol (20 mass % polyacrylonitrile) (A2–4) obtained by polymerizing acrylonitrile in the polyol (A2–3), 1 part of diethanolamine, 1 part of "SILICONE SRX-253" (a silicone-based foam stabilizer produced by TORAY DOW CORNING SILICONE CO., Ltd.), 3.7 parts of water, 0.4 part of "TEDA L33" (a triethylenediamine-based amine catalyst produced by TOSOH CO., Ltd.), and further 0.07 part of "TOYOCAT ET" (a bis(dimethylaminoethyl) ether-based amine catalyst produced by TOSOH CO., Ltd.) were mixed, and controlled at a temperature of 25° C. To this mixture liquid, 50.4 parts of a mixture of TDI/crude MDI (=80/20 mass %) (NCO index of 100) controlled at 25° C. was added and stirred by "Homodisper" (an agitator manufactured by TOKUSHU KIKA INDUSTRIES Ltd.) at 4000 rpm for 10 seconds. Then, the mixture liquid was poured into an aluminum mold of 300 mm (length)×300 mm (width)×100 mm (height) controlled at 60° C. After 10 minutes, it was removed from the mold to obtain a flexible polyurethane foam.

COMPARATIVE EXAMPLE 1

Production of a Rigid Urethane Foam by Blowing with Water Alone 100 parts of a polyol (A2—2) obtained by adding PO (2.7 moles) to glycerol (1 mole), 1.5 parts of "SILICONE SH-193", 7 parts of water, 10 parts of "FYROL CEF", and 2 parts of "Ucat-1000" were mixed, and controlled at a temperature of 25° C. To the mixture liquid, 268.0 parts of crude MDI (NCO index of 100) controlled at 25° C. was added, and the same procedures as in Example 1 were carried out. Thus, a rigid polyurethane foam was obtained.

COMPARATIVE EXAMPLE 2

Production of a Rigid Urethane Foam by Blowing with a Low Boiling Point Hydrocarbon and Water Used in Combination 100 parts of a polyol (A2–1) obtained by adding PO (4.55 moles) to pentaerythritol (1 mole), 1.5 parts of "SILICONE SH-193", 2 parts of water, 18 parts of cyclopentane, 10 parts of "FYROL CEF" and 2 parts of "Ucat-1000" were mixed, and controlled at a temperature of 25° C. To this mixture liquid, 165.6 parts of crude MDI (NCO index of 100) controlled at 25° C. was added, and the same procedures as in Example 1 were carried out. Thus, a rigid polyurethane foam was obtained.

COMPARATIVE EXAMPLE 3

Production of a Rigid Urethane Foam by Blowing with Water Alone 100 parts of a polyol (A2–1) obtained by adding PO (4.55 moles) to pentaerythritol (1 mole), 1.5 parts of "SILICONE SH-193", 7 parts of water, 10 parts of "FYROL CEF", and 2 parts of "Ucat-1000" were mixed, and controlled at a temperature of 25° C. To this mixture liquid, 168.6 parts of crude MDI (NCO index of 70) controlled at 25° C. was added, and the same procedures as in Example 1 were carried out. Thus, a rigid polyurethane foam was obtained.

COMPARATIVE EXAMPLE 4

Production of a Rigid Urethane Foam by Blowing with Water Alone 100 parts of a polyol (A2–5) obtained by adding PO (3 moles) to sorbitol (1 mole), 1.5 parts of "SILICONE SH-193", 7 parts of water, 10 parts of "FYROL CEF", and 2 parts of "Ucat-1000" were mixed, and controlled at a temperature of 25° C. To this mixture liquid, 333.7 parts of crude MDI (NCO index of 100) controlled at 25° C. was added, and the same procedures as in Example 1 were carried out. Thus, a rigid polyurethane foam was obtained.

COMPARATIVE EXAMPLE 5

Production of a Rigid Urethane Foam by Blowing with Substitute for Freon and Water Used in Combination 100 parts of a polyol (A2–1) obtained by adding PO (4.55 moles) to pentaerythritol (1 mole), 1.5 parts of "SILICONE SH-193", 2 parts of water, 32 parts of "HCFC-141b", 10 parts of "FYROL CEF", and 2 parts of "Ucat-1000" were mixed, and controlled at a temperature of 25° C. To this mixture liquid, 165.6 parts of crude MDI (NCO index of 100) controlled at 25° C. was added, and the same procedures as in Example 1 were carried out. Thus, a rigid polyurethane foam was obtained.

COMPARATIVE EXAMPLE 6

Production of a Flame-resistant Rigid Urethane Foam 100 parts of a polyol (A2—2) obtained by adding PO (2.7 moles) to glycerol (1 mole), 118 parts of aluminum hydroxide (produced by NIPPON LIGHT METAL CO., Ltd.), 2.5 parts of "SILICONE SH-193", 9 parts of water, 10 parts of "FYROL CEF", and 2 parts of "Ucat-1000" were mixed, and controlled at a temperature of 25° C. To this mixture liquid, 298.0 parts of crude MDI (NCO index of 100) controlled at 25° C. was added, and the same procedures as in Example 1 were carried out. Thus, a flame-resistant rigid polyurethane foam was obtained.

COMPARATIVE EXAMPLE 7

Production of a Flexible Urethane Foam by Blowing with Water Alone 40 parts of a polyol (A2–3) obtained by adding PO (73 moles) and further EO (16 mole) to glycerol (1 mole), 60 parts of a polymer polyol (20 mass % of polyacrylonitrile) (A2–4) obtained by polymerizing acrylonitrile in the polyol (A2–3), 1 part of diethanolamine, 1 part of "SILICONE SRX-253" (a silicone-based foam stabilizer produced by TORAY DOW CORNING SILICONE CO., Ltd.), 3.7 parts of water, 0.4 part of "TEDA L33" (an amine catalyst produced by TOSOH CO., Ltd.), and further 0.07 part of "TOYOCAT ET" (an amine catalyst produced by TOSOH CO., Ltd.) were mixed, and controlled at a temperature of 25° C. To this mixture liquid, 46.3 parts of a mixture of TDI/crude MDI (=80/20 mass %) (NCO index of 100) controlled at 25° C. was added, and the same procedures as in Example 11 were carried out. Thus, a flexible polyurethane foam was obtained.

TEST EXAMPLES

Tests for Rigid Urethane Foam:

Dimensional stability was evaluated by cutting out a foam with dimensions of 100 mm×100 mm×50 mm, measuring the dimensions of the foam one day after it was molded and two days after it was allowed to stand at a temperature of 70° C. and at a relative humidity of 95%, and calculating the rate of change in volume. The compressive strength was measured in accordance with the test method of compressive strength of JIS A 9514, and the flame resistance was measured in accordance with the test method of flame resistance of JIS A 9514. The ratio of closed cells was measured by the air-comparative aerometer 1000 manufactured by TOKYO SCIENCE CO., Ltd. Tables 1 to 3 show the M value and the measurement results of the compressive strength, rate of change in volume, thermal conductivity, test of flame resistance, and ratio of closed cells for the foams obtained in each of Examples 1 to 10 and Comparative Examples 1 to 6.

Tests for Flexible Urethane Foam:

Hardness, elongation, tear strength, and compression set were respectively measured in accordance with JIS K 6401 and JIS K 6301. Tables 4 and 5 show the M value and the measurement results of the hardness, elongation, tear strength, and compression set of the foams obtained in each of Example 11 and Comparative Example 7.

TABLE 1

| Example | 1 | 2 | 3 | 4 | 5 |
|---|---|---|---|---|---|
| M value | 73 | 185 | 83 | 139 | 78 |
| Condition of Cell | Uniform | Uniform | Uniform | Uniform | Uniform |
| Mass of Foam (g) | 175 | 177 | 177 | 176 | 176 |
| Density of Foam (kg/m$^3$) | 33.0 | 30.2 | 33.4 | 33.0 | 33.4 |
| Rate of Change in Volume (dv %) | −1.7 | +12.0 | −3.5 | −3.9 | +11.5 |
| Compressive Strength (kgf/cm$^2$) | 1.5 | 1.4 | 1.8 | 1.6 | 1.5 |
| Thermal Conductivity (kcal/m · hr · ° C.) | 0.0210 | 0.0169 | 0.0225 | 0.0218 | 0.0162 |
| Flame Resistance: | | | | | |
| Distance of Burning (cm) | — | — | — | — | — |
| Time of Burning (sec) | — | — | — | — | — |
| Ratio of Closed Cells (%) | 96 | 97 | 97 | 97 | 95 |

TABLE 2

| Example | 6 | 7 | 8 | 9 | 10 |
|---|---|---|---|---|---|
| M value | 100 | 185 | 161 | 84 | 67 |
| Condition of Cell | Uniform | Uniform | Uniform | Uniform | Uniform |
| Mass of Foam (g) | 175 | 175 | 176 | 175 | 175 |
| Density of Foam (kg/m$^3$) | 33.2 | 32.9 | 33.5 | 33.1 | 33.8 |
| Rate of Change in Volume (dv %) | −2.8 | +4.8 | +11.0 | −4.5 | −2.2 |
| Compressive Strength (kgf/cm$^2$) | 1.4 | 1.3 | 1.5 | 1.3 | 1.6 |
| Thermal Conductivity (kcal/m · hr · ° C.) | 0.0205 | 0.0169 | 0.0170 | 0.0215 | 0.0220 |
| Flame Resistance: | | | | | |
| Distance of Burning (cm) | — | — | — | — | 2.0 |
| Time of Burning (sec) | — | — | — | — | 19 |
| Ratio of Closed Cells (%) | 98 | 94 | 98 | 96 | 92 |

TABLE 3

| Comparative Example | 1 | 2 | 3 | 4 | 5 | 6 |
|---|---|---|---|---|---|---|
| M value | 250 | 200 | 200 | 89 | 200 | 250 |
| Condition of Cell | Uniform | Non-Uniform | Uniform | * | Uniform | * |
| Mass of Foam (g) | 175 | 175 | 176 | — | 175 | — |
| Density of Foam (kg/m$^3$) | 33.8 | 33.9 | 33.2 | — | 33.0 | — |
| Rate of Change in Volume (dv %) | −58.5 | — | 50.2 | — | +20.3 | — |
| Compressive Strength (kgf/cm$^2$) | 0.8 | — | 0.7 | — | 0.8 | — |
| Thermal Conductivity (kcal/m · hr · ° C.) | 0.0225 | — | 0.0229 | — | 0.0190 | — |

TABLE 3-continued

| Comparative Example | 1 | 2 | 3 | 4 | 5 | 6 |
|---|---|---|---|---|---|---|
| Flame Resistance: | | | | | | |
| Distance of Burning (cm) | — | — | — | — | — | — |
| Time of Burning (sec) | — | — | — | — | — | — |
| Ratio of Closed Cells (%) | 96 | — | 96 | — | 97 | — |

Note)
* Blowing was difficult because of high viscosity.

TABLE 4

| Example | 11 |
|---|---|
| M value | 1392 |
| Mass of Foam (g) | 342 |
| Density of Foam (kg/m$^3$) | 38.0 |
| Hardness (kgf) | 14.5 |
| Elongation (%) | 117 |
| Tear Strength (kgf/cm) | 0.58 |
| Compression Set (%) | 13 |

TABLE 5

| Comparative Example | 7 |
|---|---|
| M value | 3296 |
| Mass of Foam (g) | 342 |
| Density of Foam (kg/m$^3$) | 38.0 |
| Hardness (kgf) | 14.4 |
| Elongation (%) | 100 |
| Tear Strength (kgf/cm) | 0.45 |
| Compression Set (%) | 25 |

Considerations of Tables 1 to 5

1) Comparing the Examples 1, 3, 4 and 9 with the Comparative Examples 1 and 3, in which water alone is used as a blowing agent, each of the Examples provided a rigid foam having high mechanical strength and low rate of change in volume.
2) Comparing the Example 5 with the Comparative Example 5, in which substitute for freon and water were used in combination as blowing agents, the Example provided a rigid foam having high mechanical strength and low rate of change in volume.
3) Comparing the Examples 2 and 8 with the Comparative Example 2, in which a low boiling point hydrocarbon and water were used in combination as blowing agents, while the cells were uniform in the Examples, the cells were non-uniform in the Comparative Example. This is because the compound (A1) having an active hydrogen-containing group and an addition-polymerizable functional group used in the process of the present invention has a good compatibility with hydrocarbon.
4) Comparing the Examples 1 and 9 with the Comparative Example 3, each of the Examples provided a rigid foam having high mechanical strength and low rate of change in volume, even though the NCO index has not more than 80. This is because the compound (A1) having an active hydrogen-containing group and an addition-polymerizable functional group used in the process of the present invention is self-polymerizable.
5) Comparing the Example 10 with the Comparative Example 6, in which inorganic powder was mixed, while the cells were uniform in the Example because the viscosity of the material in which inorganic powder was dispersed in an active hydrogen component was low, blowing was difficult in the Comparative Example because the viscosity of the material in which inorganic powder was dispersed in an active hydrogen component was high.
6) Comparing the Example 11 with the Comparative Example 7, a flexible foam having large elongation, high tear strength, and small compression set was obtained in the Example.

Evaluations of Polyurethane Foams [Ib] and [Ic]

[Raw Materials Used]

Compounds (A1) having an active hydrogen-containing group and an addition-polymerizable functional group (A1–5): diethylene glycol monoacrylate (A1—1): glycerol monoacrylate Compounds (A2) having at least 2.5 (on the average) active hydrogen-containing groups and not having an addition-polymerizable functional group (A2–6): polyether polyols having a hydroxyl value of 400 in which PO is added to pentaerythritol (A2–7): polyether polyols having a hydroxyl value of 400 in which PO is added to glycerol Organic polyisocyanate (B)

(B-1): polymethylene polyphenyl isocyanate ("Lupranate M-20S" produced by BASF Corporation)

Auxiliaries (C)

Hollow Microsphere (C24–1): acrylonitrile-based thermoplastic resin hollow microsphere ("Matsumoto Microsphere MFL-80GCA" produced by MATSUMOTO YUSHI-SEIYAKU CO., Ltd.)

Inorganic Powder (C23–1): talc (Soap Stone C produced by NIHON MISTRON CO., Ltd.)

Dehydrating Agent (C25–1): molecular sieve ("Molecular Sieve 3A-B powder" produced by UNION SHOWA K.K.)

Dust-Scattering Reducer (C29–1): PEG (molecular weight 600) dioleic acid ester ("Ionet DL200" produced by Sanyo Chemical Industries, Ltd.; in liquid state)

Foam Stabilizer (C21–1): silicone-based foam stabilizer ("SZ-1932" produced by NIPPON UNICAR COMPANY LTD.)

Urethanation Catalyst (C22–1): stannic dibutyl dilaurate ("Stann BL" produced by SANKYO ORGANIC CHEMICALS CORPORATION)

Radical-Polymerization Initiator (C27–1): t-butylperoxybenzoate

[Test Methods]

Hardness: hardness was measured by "D-type hardness gauge" manufactured by KOBUNSHI KEIKI CO., Ltd. in accordance with the conditions under ASTM D2240.

Bending Strength: bending strength was measured by the "Instron type universal tester" manufactured by Shimadzu Corporation in accordance with the conditions under JIS K6911.

Impact Strength: Izod impact strength (no notch) was measured in accordance with the conditions under JIS K6911.

Scorch Resistance: the active hydrogen component was mixed with the NCO component with the amount of the catalyst being controlled to cause curing for 2 minutes under the condition of temperature controlled at 30° C. The mixture was poured into a thermal insulating mold having dimensions of 100 mm×100 mm×150 mm to a thickness of 100 mm, cured for one hour, and then removed from the mold to obtain a molded product. The molded product was cut half with a saw, and the scorch resistance was determined as x when scorching was found in the cross section, and determined as ○ when no scorching was found in the cross section.

EXAMPLES 12 to 14

Each of the raw materials was put into a planetary mixer in amounts by mass parts as shown in Table 6, and stirred at from 130 to 200 rpm for 10 minutes to obtain an active hydrogen component and a NCO component. Then, while rotating the rotor of a mechanical froth machine (MF-350 type mechanical froth foaming apparatus manufactured by TOHO MACHINERY CO., Ltd.) at 300 rpm, continuously supplied to the inlet of the mixing head were the active hydrogen component and the NCO component at a rate of 10 to 20 L/min in total and dry air in the proportion as shown in Table 1. Then, the mixture liquid in which fine bubbles were uniformly dispersed, which was continuously discharged from the outlet, was poured into an aluminum mold having dimensions of 500 mm×500 mm×200 mm to a thickness of 100 mm, and heated and cured at 80° C. for two hours. Then, it was allowed to stand and cooled for 8 hours, and removed from the mold to obtain a molded product. Table 6 shows the evaluation results of the molded product.

COMPARATIVE EXAMPLES 8 AND 9

A molded product was obtained according to the same procedures as in Examples 12 to 14 using raw materials in the amounts by mass parts as shown in Table 6. Table 6 shows the evaluation results of the molded product.

TABLE 6

|  |  | Example | | | Comparative Example | |
|---|---|---|---|---|---|---|
|  |  | 12 | 13 | 14 | 8 | 9 |
| Active Hydrogen Component | Compound (A1-5) | 15.3 | 13.6 |  |  |  |
|  | Compound (A1-1) |  |  | 13.4 |  |  |
|  | Compound (A2-6) | 15.3 | 13.6 | 13.4 | 29.6 | 26.5 |
|  | Hollow Microsphere (C24-1) | 8.1 | 7.3 | 7.1 | 7.9 | 7.1 |
|  | Inorganic Powder (C23-1) |  | 5.4 |  |  | 5.3 |
|  | Dehydrating Agent (C25-1) | 1.5 | 1.4 | 1.3 | 1.5 | 1.3 |
|  | Dust-Scattering Reducer (C29-1) | 20.4 | 18.1 | 17.9 | 19.7 | 17.6 |
|  | Foam Stabilizer (C21-1) | 1.0 | 0.9 | 0.9 | 1.0 | 0.9 |
|  | Urethanation Catalyst (C22-1) | 0.04 | 0.04 | 0.04 | 0.04 | 0.04 |
|  | Polymerization Initiator (C27-1) | 0.01 | 0.01 | 0.01 |  |  |
| NCO Component | Polyisocyanate (B-1) | 28.7 | 25.6 | 37.5 | 30.9 | 27.6 |
|  | Hollow Microsphere (C24-1) | 8.1 | 7.3 | 7.1 | 7.9 | 7.1 |
|  | Inorganic Powder (C23-1) |  | 5.4 |  |  | 5.3 |
|  | Dehydrating Agent (C25-1) | 1.5 | 1.4 | 1.3 | 1.5 | 1.3 |
|  | Amount of Air (volume %*) | 60.5 | 49.0 | 62.7 | 61.0 | 49.5 |
| Evaluation Results | Density (g/cm³) | 0.25 | 0.35 | 0.25 | 0.25 | 0.35 |
|  | Hardness (Shore D) | 22 | 45 | 23 | 12 | 39 |

TABLE 6-continued

|  |  | Example | | | Comparative Example | |
|---|---|---|---|---|---|---|
|  |  | 12 | 13 | 14 | 8 | 9 |
| of Molded Product | Bending Strength (kgf/mm²) | 0.5 | 1.2 | 0.5 | 0.2 | 0.8 |
|  | Impact Strength | 2.0 | 3.5 | 2.1 | 0.8 | 2.0 |
|  | Scorch Resistance | ○ | ○ | ○ | X | X |

Note)
*volume % = {Volume of Air/(Volume of Air + Total Volume of the Composition)} × 100, wherein the Volume of Air indicates the volume at 25° C. and at 1 atm.

EXAMPLES 15 TO 17

Each of the raw materials was put into a planetary mixer in the amounts by mass parts as shown in Table 7, and stirred at 130 rpm for 10 minutes to obtain an active hydrogen component. Mixing was also performed in the same way when incorporating auxiliaries in a NCO component. Then, the active hydrogen component and the NCO component were put into a vessel of 1 L in the proportions as shown in Table 7 so that their total mass may become about 400 g, and mixed by a propeller blade for about 1 minute. The mixture liquid was poured into a metallic mold having dimensions of 50 mm X 50 mm X 200 mm, and after it was defoamed under a reduced pressure for about 30 seconds, it was heated and cured at 80° C. for two hours. Then, it was allowed to stand and cooled for 8 hours, and removed from the mold to obtain a molded product. Table 7 shows the evaluation results of the molded product.

COMPARATIVE EXAMPLES 10 AND 11

A molded product was obtained according to the same procedures as in Examples 15 to 17 using the raw materials in the amounts by mass parts as shown in Table 7. Table 7 shows the evaluation results of the molded product.

TABLE 7

|  |  | Example | | | Comparative Example | |
|---|---|---|---|---|---|---|
|  |  | 15 | 16 | 17 | 10 | 11 |
| Active Hydrogen Component | Compound (A1-5) | 15.0 | 13.6 |  |  |  |
|  | Compound (A1-1) |  |  | 12.7 |  |  |
|  | Compound (A2-6) |  |  |  |  |  |
|  | Compound (A2-7) | 15.0 | 13.6 | 12.7 | 29.1 | 25.2 |
|  | Hollow Microsphere (C24-1) | 9.0 | 8.2 | 9.3 | 9.3 | 8.4 |
|  | Inorganic Powder (C23-1) |  | 4.5 |  |  | 5.9 |
|  | Dehydrating Agent (C25-1) | 1.5 | 1.4 | 1.3 | 1.4 | 1.3 |
|  | Dust-Scattering Reducer (C29-1) | 20.0 | 18.2 | 17.0 | 18.6 | 16.8 |
|  | Foam Stabilizer (C21-1) | 1.0 | 0.9 | 0.8 | 0.9 | 0.8 |
|  | Urethanation Catalyst (C22-1) | 0.04 | 0.04 | 0.03 | 0.04 | 0.03 |
|  | Polymerization Initiator (C27-1) | 0.01 | 0.01 | 0.01 |  |  |
| NCO Component | Polyisocyanate (B-1) | 28.0 | 25.5 | 35.5 | 30.0 | 26.0 |
|  | Hollow Microsphere (C24-1) | 9.0 | 8.2 | 9.3 | 9.3 | 8.4 |
|  | Inorganic Powder (C23-1) |  | 4.5 |  |  | 5.9 |
|  | Dehydrating Agent (C25-1) | 1.5 | 1.4 | 1.3 | 1.4 | 1.3 |

TABLE 7-continued

|  |  | Example | | | Comparative Example | |
| --- | --- | --- | --- | --- | --- | --- |
|  |  | 15 | 16 | 17 | 10 | 11 |
| Evaluation Results of Molded Product | Density (g/cm³) | 0.60 | 0.65 | 0.60 | 0.60 | 0.65 |
|  | Hardness (Shore D) | 60 | 62 | 60 | 51 | 56 |
|  | Bending Strength (kgf/mm²) | 2.5 | 2.7 | 2.5 | 1.8 | 2.0 |
|  | Impact Strength | 5.4 | 6.0 | 5.6 | 4.4 | 5.0 |
|  | Scorch Resistance | ○ | ○ | ○ | X | X |

EXAMPLE 18

80 parts of diethylene glycol monoacrylate (A1–5), 18 parts of hollow microsphere (C24–1), and 2 parts of dehydrating agent (C25–1) were put into a planetary mixer and stirred at 130 rpm for 10 minutes to obtain an active hydrogen component. 80 parts of organic polyisocyanate (B-1), 18 parts of hollow microsphere (C24–1), and 2 parts of dehydrating agent (C25–1) were put into a planetary mixer and stirred at 130 rpm for 10 minutes to obtain a NCO component. Then, 195 parts of the active hydrogen component, 165 parts of the NCO component, 40 parts of staple fiber of glass fiber roving ("ER 4630" produced by ASAHI FIBER GLASS CO., Ltd.) cut to a length of 6 mm (C26–1), 0.16 part of urethanation catalyst (C22–1), and 0.02 part of radical-polymerization initiator (C27–1) were put into a vessel of 1 L, and mixed by a propeller blade for about 1 minute. The mixture liquid was poured into a metallic mold having dimensions of 50 mm×50 mm×200 mm, and after it was defoamed under a reduced pressure for about 30 seconds, it was heated and cured at 80° C. for two hours. Then, it was allowed to stand and cooled for 8 hours, and removed from the mold to obtain a molded product.

EXAMPLE 19

74 parts of diethylene glycol monoacrylate (A1–5), 24 parts of hollow microsphere (C24–1), and 2 parts of dehydrating agent (C25–1) were put into a planetary mixer and stirred at 130 rpm for 10 minutes to obtain an active hydrogen component. 74 parts of organic polyisocyanate (B-1), 24 parts of hollow microsphere (C24–1), and 2 parts of dehydrating agent (C25–1) were put into a planetary mixer and stirred at 130 rpm for 10 minutes to obtain a NCO component. Then, 173 parts of the active hydrogen component, 147 parts of the NCO component, 80 parts of staple fiber (C26–1), 0.14 part of urethanation catalyst (C22–1), and 0.02 part of radical-polymerization initiator (C27–1) were put into a vessel of 1 L, and mixed by a propeller blade for about 1 minute. The mixture liquid was poured into a metallic mold having dimensions of 50 mm×50 mm×200 mm, and after it was defoamed under a reduced pressure for about 30 seconds, it was heated and cured at 80° C. for two hours. Then, it was allowed to stand and cooled for 8 hours, and removed from the mold to obtain a molded product.

EXAMPLE 20

80 parts of glycerol monoacrylate (A1–1), 18 parts of hollow microsphere (C24–1), and 2 parts of dehydrating agent (C25–1) were put into a planetary mixer and stirred at 130 rpm for 10 minutes to obtain an active hydrogen component. 80 parts of organic polyisocyanate (B-1), 18 parts of hollow microsphere (C24–1), and 2 parts of dehydrating agent (C25–1) were put into a planetary mixer and stirred at 130 rpm for 10 minutes to obtain a NCO component. Then, 126 parts of the active hydrogen component, 234 parts of the NCO component, 40 parts of staple fiber (C26–1), 0.16 part of urethanation catalyst (C22–1), and 0.01 part of radical-polymerization initiator (C27–1) were put into a vessel of 1 L, and mixed by a propeller blade for about 1 minute. The mixture liquid was poured into a metallic mold having dimensions of 50 mm×50 mm×200 mm, and after it was defoamed under a reduced pressure for about 30 seconds, it was heated and cured at 80° C. for two hours. Then, it was allowed to stand and cooled for 8 hours, and removed from the mold to obtain a molded product.

EXAMPLE 21

80 parts of glycerol diacrylate (A1–2), 18 parts of hollow microsphere (C24–1), and 2 parts of dehydrating agent (C25–1) were put into a planetary mixer and stirred at 130 rpm for 10 minutes to obtain an active hydrogen component. 80 parts of organic polyisocyanate (B-1), 18 parts of hollow microsphere (C24–1), and 2 parts of dehydrating agent (C25–1) were put into a planetary mixer and stirred at 130 rpm for 10 minutes to obtain a NCO component. Then, 214 parts of the active hydrogen component, 146 parts of the NCO component, 40 parts of staple fiber (C26–1), 0.16 part of urethanation catalyst (C22–1), and 0.04 part of radical-polymerization initiator (C27–1) were put into a vessel of 1 L, and mixed by a propeller blade for about 1 minute. The mixture liquid was poured into a metallic mold having dimensions of 50 mm×50 mm×200 mm, and after it was defoamed under a reduced pressure for about 30 seconds, it was heated and cured at 80° C. for two hours. Then, it was allowed to stand and cooled for 8 hours, and removed from the mold to obtain a molded product.

EXAMPLE 22

80 parts of diethylene glycol monoacrylate (A1–5), 20 parts of staple fiber of glass chopped strand ("RES015-BM38" produced by NIPPON SHEET GLASS CO., LTD.) (C26–2), 18 parts of hollow microsphere (C24–1), 2 parts of dehydrating agent (C25–1), 1 part of foam stabilizer (C21–1), 0.16 part of urethanation catalyst (C22–1), and 0.01 part of radical-polymerization initiator (C27–1) were put into a planetary mixer and stirred at 130 rpm for 10 minutes to obtain an active hydrogen component. 80 parts of organic polyisocyanate (B-1), 20 parts of staple fiber (C26–2), 18 parts of hollow microsphere (C24–1) and 2 parts of dehydrating agent (C25–1) were put into a planetary mixer and stirred at 130 rpm for 10 minutes to obtain a NCO component. Then, while rotating the rotor of a mechanical froth machine (MF-350 type mechanical froth foaming apparatus manufactured by TOHO MACHINERY CO., Ltd.) at 300 rpm, continuously supplied to the inlet of the mixing head were the active hydrogen component and the NCO component with a mass ratio of 100:70 at 18.6 L/min in total and dry air at 1.4 L/min. Then, the mixture liquid in which fine bubbles were uniformly dispersed, which was continuously discharged from the outlet, was poured into an aluminum mold having dimensions of 500 mm×500 mm×200 mm to a thickness of 100 mm, and heated and cured at 80° C. for two hours. Then, it was allowed to stand and cooled for 8 hours, and removed from the mold to obtain a molded product.

COMPARATIVE EXAMPLE 12

80 parts of a compound containing an active hydrogen-containing group (A2–7), 18 parts of hollow microsphere (C24–1), and 2 parts of dehydrating agent (C25–1) were put into a planetary mixer and stirred at 130 rpm for 10 minutes to obtain an active hydrogen component. 80 parts of organic polyisocyanate (B-1), 18 parts of hollow microsphere (C24–1), and 2 parts of dehydrating agent (C25–1) were put into a planetary mixer and stirred at 130 rpm for 10 minutes to obtain a NCO component. Then, 180 parts of the active hydrogen component, 180 parts of the NCO component, 40 parts of staple fiber (C26–1), and 0.16 part of urethanation catalyst (C22–1) were put into a vessel of 1 L, and mixed by a propeller blade for about 1 minute. The mixture liquid was poured into a metallic mold having dimensions of 50 mm×50 mm×200 mm, and after it was defoamed under a reduced pressure for about 30 seconds, it was heated and cured at 80° C. for two hours. Then, it was allowed to stand and cooled for 8 hours, and removed from the mold to obtain a molded product.

COMPARATIVE EXAMPLE 13

74 parts of a compound containing an active hydrogen-containing group (A2–7), 24 parts of hollow microsphere (C24–1), and 2 parts of dehydrating agent (C25–1) were put into a planetary mixer and stirred at 130 rpm for 10 minutes to obtain an active hydrogen component. 74 parts of organic polyisocyanate (B-1), 24 parts of hollow microsphere (C24–1), and 2 parts of dehydrating agent (C25–1) were put into a planetary mixer and stirred at 130 rpm for 10 minutes to obtain a NCO component. Then, 160 parts of the active hydrogen component, 160 parts of the NCO component, 80 parts of staple fiber (C26–1), and 0.14 part of urethanation catalyst (C22–1) were put into a vessel of 1 L and mixed by a propeller blade. However, the mixing could not be performed uniformly, so that a molded product could not be obtained.

COMPARATIVE EXAMPLE 14

80 parts of a compound containing an active hydrogen-containing group (A2–7), 20 parts of staple fiber (C26–2), 18 parts of hollow microsphere (C24–1), 2 parts of dehydrating agent (C25–1), 1 part of foam stabilizer (C21–1), and 0.16 part of urethanation catalyst (C22–1) were put into a planetary mixer and stirred at 130 rpm for 10 minutes to obtain an active hydrogen component. 80 parts of organic polyisocyanate (B-1), 20 parts of staple fiber (C26–2), 18 parts of hollow microsphere (C24–1), and 2 parts of dehydrating agent (C25–1) were put into a planetary mixer and stirred at 130 rpm for 10 minutes to obtain a NCO component. Then, while rotating the rotor of a mechanical froth machine (MF-350 type mechanical froth foaming apparatus manufactured by TOHO MACHINERY CO., Ltd.) at 300 rpm, continuously supplied to the inlet of the mixing head were the active hydrogen component and the NCO component with a mass ratio of 1:1 at 18.9 L/min in total and dry air at 1.1 L/min. Then, the mixture liquid in which fine bubbles were uniformly dispersed, which was continuously discharged from the outlet, was poured into an aluminum mold having dimensions of 500 mm×500 mm×200 mm to a thickness of 100 mm, and heated and cured at 80° C. for two hours. Then, it was allowed to stand and cooled for 8 hours, and removed from the mold to obtain a molded product.

TEST EXAMPLE

Tables 8 and 9 show the respective measurement results of the amount of glass fiber, hardness, bending strength, bending modulus, moldability, and compactness of the obtained molded products of rigid polyurethane foam. In Tables 8 and 9, the amount of glass fiber refers to the value calculated from the mass of glass fiber mixed in the composition. Hardness, bending strength, and bending modulus were respectively measured according to the conditions under ASTM D2240 and JIS K7055.

Moldability was determined as ○ when a molded product in which glass fiber is uniformly dispersed and which has no defect was obtained, and as × when it was not. Furthermore, compactness was determined as ○ when the ratio of the microcells having a size of not more than 150 μm to all microcells that appeared on a photograph of a cut surface of a molded product taken by a scanning electron microscope with a magnification of 100 was at least 90%, and as × when it was not.

TABLE 8

|  | Example | | | | Comparative Example | |
| --- | --- | --- | --- | --- | --- | --- |
|  | 18 | 19 | 20 | 21 | 12 | 13 |
| Amount of Glass Fiber (mass %) | 10.0 | 20.0 | 10.0 | 10.0 | 10.0 | 20.0 |
| Density (g/cm$^3$) | 0.67 | 0.67 | 0.68 | 0.67 | 0.66 | — |
| Hardness (Shore D) | 81 | 85 | 79 | 80 | 77 | — |
| Bending Strength (kgf/mm$^2$) | 6.0 | 9.5 | 5.8 | 6.0 | 4.5 | — |
| Bending Modulus (kgf/mm$^2$) | 220 | 310 | 190 | 210 | 140 | — |
| Moldability | ○ | ○ | ○ | ○ | ○ | X |
| Compactness | ○ | ○ | ○ | ○ | ○ | X |

TABLE 9

|  | Example 22 | Comparative Example 14 |
| --- | --- | --- |
| Amount of Glass Fiber (mass %) | 16.6 | 16.6 |
| Density (g/cm$^3$) | 0.66 | 0.66 |
| Hardness (Shore D) | 83 | 80 |
| Bending Strength (kgf/mm$^2$) | 9.0 | 6.0 |
| Bending Modulus (kgf/mm$^2$) | 300 | 220 |
| Moldability | ○ | ○ |
| Compactness | ○ | X |

Evaluation of Polyurethane Foam [2]

EXAMPLE 23

5 parts of glycerol monoacrylate (A1–1), 100 parts of a polyol (A2–3) obtained by adding PO (73 mole) and further EO (16 mole) to glycerol (1 mole), 1 part of diethanolamine (A2–8), 1 part of "SILICONE SRX-253" (silicone-based foam stabilizer produced by TORAY DOW CORNING SILICONE CO., Ltd.), 3.5 parts of water, 0.4 part of "TEDA L33" (amine catalyst produced by TOSOH CO., Ltd.), and further 0.07 part of "TOYOCAT ET" (amine catalyst produced by TOSOH CO., Ltd.) were mixed, and controlled at a temperature of 25° C. To this mixture liquid, 51.3 parts of a mixture of TDI/crude MDI (=80/20 mass %) (NCO index of 100) controlled at 25° C. was added, and stirred by "Homodisper" (an agitator manufactured by TOKUSHU KIKA INDUSTRIES Ltd.) at 4000 rpm for 10 seconds. Then, the mixture liquid was poured into an aluminum mold of 300 mm (length)×300 mm (width)×100 mm (height) controlled at 60° C. After 10 minutes, it was removed from the mold to obtain a flexible polyurethane foam.

EXAMPLE 24

5 parts of glycerol diacrylate (A1–2), 100 parts of the polyol (A2–3), 1 part of diethanolamine (A2–8), 1 part of "SILICONE SRX-253" (silicone-based foam stabilizer produced by TORAY DOW CORNING SILICONE CO., Ltd.), 3.5 parts of water, 0.4 part of "TEDA L33" (amine catalyst produced by TOSOH CO., Ltd.), and further 0.07 part of "TOYOCAT ET" (amine catalyst produced by TOSOH CO., Ltd.) were mixed, and controlled at a temperature of 25° C. To this mixture liquid, 47.1 parts of a mixture of TDI/crude MDI (=80/20 mass %) (NCO index of 100) controlled at 25° C. was added and stirred by "Homodisper" (an agitator manufactured by TOKUSHU KIKA INDUSTRIES Ltd.) at 4000 rpm for 10 seconds. Then, the mixture liquid was poured into an aluminum mold of 300 mm (length)×300 mm (width)×100 mm (height) controlled at 60° C. After 10 minutes, it was removed from the mold to obtain a flexible polyurethane foam.

EXAMPLE 25

5 parts of pentaerythritol PO 4-molar adduct triacrylate (A1–3), 100 parts of the polyol (A2–3), 1 part of diethanolamine (A2–8), 1 part of "SILICONE SRX-253" (silicone-based foam stabilizer produced by TORAY DOW CORNING SILICONE CO., Ltd.), 3.5 parts of water, 0.4 part of "TEDA L33" (amine catalyst produced by TOSOH CO., Ltd.), and further 0.07 part of "TOYOCAT ET" (amine catalyst produced by TOSOH CO., Ltd.) were mixed, and controlled at a temperature of 25° C. To this mixture liquid, 46.1 parts of a mixture of TDI/crude MDI (=80/20 mass %) (NCO index of 100) controlled at 25° C. was added and stirred by "Homodisper" (an agitator manufactured by TOKUSHU KIKA INDUSTRIES Ltd.) at 4000 rpm for 10 seconds. Then, the mixture liquid was poured into an aluminum mold of 300 mm (length)×300 mm (width)×100 mm (height) controlled at 60° C. After 10 minutes, it was removed from the mold to obtain a flexible polyurethane foam.

COMPARATIVE EXAMPLE 15

75 parts of the polyol (A2–3), 25 parts of a polymer polyol (20 mass % polyacrylonitrile) (A2–4) obtained by polymerizing acrylonitrile in the polyol (A2–3), 1 part of diethanolamine (A2–8), 1 part of "SILICONE SRX-253" (silicone-based foam stabilizer produced by TORAY DOW CORNING SILICONE CO., Ltd.), 3.5 parts of water, 0.4 part of "TEDA L33" (amine catalyst produced by TOSOH CO., Ltd.), and further 0.07 part of "TOYOCAT ET" (amine catalyst produced by TOSOH CO., Ltd.) were mixed, and controlled at a temperature of 25° C. To this mixture liquid, 44.7 parts of a mixture of TDI/crude MDI (=80/20 mass %) (NCO index of 100) controlled at 25° C. was added, and the same procedures as in Example 23 were carried out to obtain a flexible polyurethane foam.

TEST EXAMPLE

Hardness, elongation, tear strength, and compression set were measured respectively in accordance with the conditions under JIS K 6401 and JIS K 6301. Table 10 shows the M' value, K1, K2, and the measurement results of the hardness, elongation, tear strength, and compression set of the foams obtained in each of Examples 23 to 25 and Comparative Example 15.

TABLE 10

|  | Example | | | Comparative Example |
|---|---|---|---|---|
|  | 23 | 24 | 25 | 15 |
| M' value | 1284 | 1167 | 1557 | 4885 |
| K1 | 0.3 | 0.1 | 0.3 | 0.3 |
| K2 | 2000 | 2000 | 2000 | — |
| Weight of Foam (g) | 342 | 338 | 342 | 340 |
| Density of Foam (kg/m$^3$) | 38.0 | 37.5 | 38.0 | 37.8 |
| Hardness (kgf) | 14.2 | 15.8 | 13.2 | 10.4 |
| Elongation (%) | 103 | 99 | 101 | 100 |
| Tear Strength (kgf/cm) | 0.48 | 0.45 | 0.49 | 0.45 |
| Compression Set (%) | 19 | 18 | 20 | 24 |

INDUSTRIAL APPLICABILITY

The polyurethane foam of the present invention has the following characteristics and effects:

1) The present invention provides a polyurethane foam excellent in mechanical properties based on the technique applicable to a wide variety of rigid or flexible foams.
2) The present invention provides a foam having mechanical properties such as excellent hardness and dimensional stability in the case of forming a rigid foam, and such as small compression set in the case of forming a flexible foam.
3) The present invention provides a rigid foam blown with a blowing agent such as a hydrogen atom-containing halogenated hydrocarbon, water, low boiling point hydrocarbon, liquefied carbon dioxide gas, or the like, which has the same dimensional stability and the same or higher mechanical strength as in the case of using conventional CFC-11, and which has good thermal insulation and flame resistance.
4) The present invention provides not only a rigid foam blown with a blowing agent that is excellent in these mechanical properties, but also a rigid foam excellent in these mechanical properties in the form of a mechanical froth foam or a syntactic foam produced in the absence of a blowing agent.
5) The present invention provides a rigid polyurethane foam which is of light weight and has an even density distribution, has a fine surface when cut, and the reduction in the mechanical properties is small when its density is decreased.
6) The present invention provides a staple fiber-reinforced rigid polyurethane foam having high bending strength and high bending modulus.
7) The present invention provides a mechanical froth foam that is applicable for repeated uses such as for materials of molds or for uses subject to a bending stress. In producing this mechanical froth foam, even when the amount of the staple fiber used in the composition is increased, viscosity of the composition does not become as high as in a conventional case. Thus, mechanical stirring can be sufficiently performed, so that inert gas is uniformly dispersed. Thus, the obtained foam has high mechanical strength.
8) The present invention provides a flexible foam in which its hardness and ball rebound are not reduced when its density is decreased.
9) The present invention provides a process for producing a polyurethane foam using an active hydrogen component having low viscosity.

10) The present invention provides a process for producing a polyurethane foam excellent in mechanical properties.
11) The present invention provides a composition for forming a polyurethane foam excellent in mechanical properties.
12) The present invention provides an addition-polymerizable active hydrogen component for forming a polyurethane foam excellent in mechanical properties.

Because of the above-mentioned effects, the polyurethane foam of the present invention is useful as a rigid polyurethane foam that can be used as a thermal insulator, shock absorbing material, synthetic wood (including for the use of structural materials or materials for models, etc.), etc., or as a flexible polyurethane foam that can be used as a cushioning material, shock-absorbing material, sound insulating/absorbing material, etc.

What is claimed is:

1. A polyurethane foam which is obtained by reacting an addition-polymerizable active hydrogen component comprising a compound (A1) with or without not more than 80 mass % of a compound (A0) based on a total mass of the compunds (A1) and ( A0), or comprising a compound (A1) and a compound (A2) with or without not more than 80 mass % of a compound (A0) based on the total mass of the compounds (A1) and (A0), with an organic polyisocyanate in the presence or absence of at least one auxiliary selected from the group consisting of vlowing agents and additives to polyurethane under a condition in which addition polymerization chains and polyurethane chains are crosslinked, and which has a structure in which addition-polymerization chains are cross-linked to polyurethane chains; the compound (A1) having an active hydrogen-containing group and an addition-polymerizable functional group represented by a general formula (1); the compound (A2) having at least 2.5 active hydrogen-containing groups, and a value of active hydrogen-containing group of the compound of at least 40, and not having an addition-polymerizable functional group; the compound (A0) containing an addition-polymerizable functional group and not having an active hydrogen-containing group; wherein (1) is

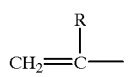
(1)

wherein R denotes hydrogen, an alkyl group having 1 to 15 carbon atoms, or an aryl group having 6 to 21 carbon atoms;
wherein (A1) is a compound selected from compounds (A1/1) to (A1/4), wherein (A1/1) are partial esters of an unsaturated carboxylic acid with a polyol selected from polyols (i) to (vi), wherein
(i) are dihydric alcohols;
(ii) are alcohols with a value of 3 to 8 selected from glycerol, trimethylolpropane, pentaerythritol, diglycerol, α- methylglucoside, sorbitol, xylitol, mannito, glucose, fructose, and sucrouse;
(iii) are polyhdric phenols;
(iv) are polyether polyols derived from alkylene oxides with a polyhydric alcohol or a polyhydric phenol;
(v) are polyether polyols derived from alkylene oxides with an amine;
(vi) are polyester polyols derived from a polyhydric alcohol and a polycarboxylic acid;

(A1/2) are partially amidated compounds derived from an unsaturated carboxylic acid and a polyamine, or alkanolamides derived from an unsaturated caroxylic acid and an alkanolamine;
(A1/3) are partial thioesterof an unsaturated carboxylic acid with a polythiol;
(A1/4) are vinyl monomers having a hydroxyl group selected from l-hydroxylstyrene, (meth)allyl alcohol, cinnamyl alcohol, crotonyl alcohol, and alkylene oxide adducts of these compounds.

2. A polyurethane foam which is obtained by reacting an addition-polymerizable polymerizable active hydrogen component (A) comprising a compound (A1) with or without not more than 80 mass % of a compound (A0) based on a total mass of the compounds (A1) and (A0), or comprising a compound (A1) and a compound (A2) with or without not more than 80 mass % of a compound (A0) based on the total mass of the compounds (A1) and (A0), with an organic polyisocyanate (B) in the presence or absence of at least one auxiliary (C) selected from the group consisting of blowing agents (C1) and additives (C2) to polymerize the addition-polymerizable which addition polymerization functional group and simultaneously form a polyurethane under a condition in which addition polymerization chains and polyurethane chains are crosslinked; the compound (A1) having at least one group containing active hydrogen (w) and at least one addition-polymerizable functional group (x) represented by a general formula (1); the compound (A2) having at least 2.5 groups (w) and not having the group (x); the compound (A0) containing an addition-polymerizable functional group and not having an active hydrogen-containing group;
wherein in the case of using a combination of the compounds (A1) and (A2) in the component (A) it is selected from 1to 3, wherein
① is a compound (A11) having one group (w) as the compound (A1), and a compound with a value of active hydrogen-containing group of at least 40as the compound (A2);
② is a compound (A12) having at least two groups (w) as the compound (A1), and the compound (A2);
③ is a compound (A11), the compound (A12), and the compound (A2); wherein an amount of (A12) being at least 5 mass % based on a total mass of the compounds (A11) and (A12); wherein (1)is

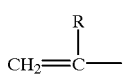
(1)

wherein R denotes hydrogen, an alkyl group having 1to 15carbon atoms, or an aryl group having 6 to 21 carbon atoms;
wherein (A1) is a compound selected from compounds (A1/1) to (A1/4), wherein
(A1/1) are partial esters of an unsaturated carboxylic acid with a polyol selected from polyols (i) to (vi), wherein
(i) are dihydric alcohols;
(ii) are alcohols with a value of 3 to 8 selected from glycerol, trimathylolpropane, pentaerythritol, diglycerol, α-methylglucoside, sorbitol, xylitol, mannitol, glucose, fructose, and sucrose;
(iii) are polyhydric phenols;

(iv) are polyether polyols derived from alkylene oxiders with a polyhydric alcohol or a polyhydric phenol;

(v) are polyether polyols derived from alkylene oxiders with an amine;

(vi) are polyester polyols derived from a polyhydric alcohol and a polycarboxylic acid, (A1/2) are partially amidated compounds derived from an unsaturated acid and a polyamine, or alkanolamides derived from an unsaturated carboxylic acid and an alkanolamine;

(A1/3) are partial thioesters of an unsaturated carboxylic acid with a polythiol;

(A1/4) are vinyl monomers having a hydroxyl group selected from p-hydroxylstyrene, (meth)allyl alcohol, cinnamyl alcohol, crotonyl alcohol, and alkylene oxide adducts of these compounds.

3. The polyurethane foam according to claim 2, wherein an amount of the compound (A1) is from 1 to 100 mass % based on the total mass of the compounds (A1) and (A2).

4. The polyurethane foam according to claim 2, wherein the compound (A1) has from 1 to 10 addition-polymerizable functional groups, and from 1 to 8 groups containing active hydrogen, which are preferably hydroxyl groups.

5. The polyurethane foam according to claim 2, wherein the compound (A1) is at least one active hydrogen compound having an active hydrogen-containing group, and an acryloyl or methacryloyl group.

6. The polyurethane foam according to claim 2 or 3, wherein a reaction rate constant K1 between the active hydrogen-containing group (w) in each of the compounds (A1) and (A2) and an isocyanate group (z) in (B) at 120° C. is not more than 1 (liter/mol/sec);

a polymerization reaction rate constant K2 of the addition-polymerizable functional group (x) in the compound (A1) is not less than 10 (liter/mol/sec); and K2/K1 is not less than 100.

7. The polyurethane foam according to claim 2 or 3, wherein the compound (A2) comprises a compound having from 3 to 8 groups containing active hydrogen selected from hydroxyl, mercapto, and amino groups, which is preferably at least one polyol selected from the group consisting of polyether polyols and polyester polyols.

8. The polyurethane foam according to claim 1, which is a rigid polyurethane foam, and in which the component (A) satisfies a requirement that a M value expressed by a formula (2) below is not more than 500, and in which in the case of containing the compound (A2) in the component (A) a value of active hydrogen-containing group of the compound (A2) is from 200 to 1000

$$M=J/(K+L\times 2-2) \qquad (2)$$

wherein J denotes a (number average) molecular weight of the component (A); K denotes an (average) number of the active hydrogen-containing group per molecule of the component (A); and L denotes an (average) number of the addition-polymerizable functional group per molecule of the component (A).

9. The polyurethane foam according to claim 8, which is obtained by using as auxiliaries (C) a blowing agent (C1) and as needed a foam stabilizer (C21) and/or an urethanation catalyst (C22) as additives (C2), and which has a density of 5 to 900 kg/m³.

10. The polyurethane foam according to claim 8, which is obtained by carrying out a polyurethane-forming reaction by mechanical froth method without using as auxiliaries (C) a blowing agent (C1) but using an inorganic powder (C23) and/or a hollow microsphere (C24), a dehydrating agent (C25), and as needed a foam stabilizer (C21) and/or an urethanation catalyst (C22) as additives (C2).

11. The polyurethane foam according to claim 8, which is obtained by forming a syntactic foam without using as auxiliaries (C) a blowing agent (C1) but using a hollow microsphere (C24), a dehydrating agent (C25), and as needed an inorganic powder (C23) as additives (C2).

12. The polyurethane foam according to claim 8, which is obtained by further using a staple fiber (C26) as an additive (C2).

13. A thermal insulator comprising the polyurethane foam according to claim 8.

14. A shock-absorbing material comprising the polyurethane foam according to claim 8.

15. A synthetic wood comprising the polyurethane foam according to claim 8.

16. The polyurethane foam according to claim 2 or 3, which is a flexible polyurethane foam having a density of 10 to 500 kg/m³, and in which the component (A) satisfies a requirement that a M value expressed by a formula (2) below is at least 500

$$M=J/(K+L\times 2-2) \qquad (2)$$

wherein J denotes a (number average) molecular weight of the component (A); K denotes an (average) number of the active hydrogen-containing group per molecule of the component (A); and L denotes an (average) number of the addition-polymerizable functional group per molecule of the component (A).

17. A polyurethane foam comprising an elastic polyurethane foam obtained by reacting an addition-polymerizable active hydrogen componenet (A') with an organic polyisocyanate (B) in the presence or absence of at least one auxiliary (C) selected from the group consisting of blowing agents (C1) and additives (C2) to polymerize the addition-polymerizable functional group and simultaneously form a polyurethane under condition in which addition polymerization chains and polyurethane chains are crosslinked.

addition-polymerizable active hydrogen component (A') is an addition-polymeriazable active hydrogen component which comprises an active hydrogen-containing group (w) and an addition-polymerizable functional group (x) and which is selected from (A31), (A32), and (A33); wherein a reaction rate constant K1 between the active hydrogen-containing group (w) and an isocyanate group (z) at 120 ° C. is not more than 1 (liter/mol/sec); a polymerization reaction rate constant K2 of the addition-polymerizable functional group (x) is not less than 10 (liter/mol/sec); and K2/K1 is not less than 100, wherein (A31) is an addition-polymerizable active hydrogen compound which has an active hydrogen-containing group (w) and an addition-polymerizable functional group (x), and which may have a cyclic group (y) reactive with the group (w);

(A32) is an active hydrogen compound (A321) having at least three groups (w) or having the groups (w) and (y), and an addition-polymerizable compound (A322) having the groups (x) and (y), used in combination;

(A33) is compound (A31) and the compound (A322), used in combination;

wherein a compound (A311) having an active hydrogen-containing group (w) and an addition-polymerizable functional group (x) among the compound (A31) has a group (x) represented by a following general formula (1) and is selected from (A1/1) to (A1/4), wherein (1) is

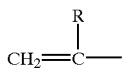
(1)

wherein R denotes hydrogen, an alkyl group having 1 to 15 carbon atoms, or an aryl group having 6 to 21 carbon atoms;
  wherein (A1) is a compound selected from compounds (A1/1) to (A1/4), wherein
    (A1/1) are partial esters of an unsaturated carboxylic acid with a polyol selected from polyols (i) to (vi), wherein
    (i) are dihydric alcohols;
    (ii) are alcohols with a value of 3 to 8 selected from glycerol, trimethylolpropane, pentaerythrit, diglycerol, α-methylglucoside, sorbitol, xylitol, mannitol, glucose, fructose, and sucrose;
    (iii) are polyhydric phenols;
    (iv) are polyether polyols derived from alkylene oxiders with a polyhydric alcohol or a polyhydric phenol;
    (v) are polyether polyols derived from alkylene oxiders with an amine;
    (vi) are polyester polyols derived from apolyhydric alcohol and a polycarboxylic acid;
    (A1/2) are partially amidated compounds derived from an unsaturated carboxylic acid and a polyamine, or alkanolamiders derived from an unsaturted carboxylic acid and an alkanolamine;
    (A1/3) are partial thioesters of an unsaturated carboxylic acid with polythiol;
    (A1/4) are vinyl monomers having a hydroxyl group selected from p-hydroxylstyrene, (meth)allyl alcohol, cinnamyl alcohol, crotonyl alcohol, and alkylene oxide adducts of these compounds.

18. A cushioning material comprising the polyurethane foam according to claim 16.

19. A shock-absorbing material comprising the polyurethane foam according to claim 16.

20. A sound insulating/absorbing material comprising the polyurethane foam according to claim 16.

21. A process for producing a polyurethane foam which comprises reacting an addition-polymerizable active hydrogen component (A) comprising a compound (A1) with or without not more than 80 mass % of a compound (A0) based on a total mass of the compounds (A1) and (A0), or comprising a compound (A1) and a compound (A2) with or without not more than 80 mass % of a compound (A0) based on the total mass of the compounds (A1) and (A0), with
  an organic polyisocyanate (B) in the presence or absence of at loeast one auxiliary (C) selected from the group consisting of blowing agents (C1) and additives (C2) to polymerize the addition-polymerizable functional group and simultaneously form a polyurethane under a condition in which addition polymerization chains and polyurethane chains are crosslinked; the compound (A1) having at least one group containing active hydrogen (w) and at least one addition-polymerizable functional group (x) represented by a general formula (1); the compound (A2) having at least 2.5 groups (w) and not having the group (x); the compound (A0) containing an addition-polymerizable functional group and not having an active hydrogen-containing group;

wherein in the case of using a combination of the compounds (A1) and (A2) in the component (A) it is selected from 1 to 3, wherein
  ① is a compound (A11) having one group (w) as the compound (A1), and a compound with a value of active hydrogen-containing group of at least 40 as the compound (A2);
  ② is a compound (A12) having at least two groups (w) as the compound (A1), and the compound (A2);
  ③ is the compound (A11), the compound (A12), and the compound (A2); wherein an amount of (A12) being at leastk 5 mass % based on a total mass of the compounds (A11) and (A12); wherein (1) is

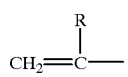
(1)

wherein R denotes hydrogen, an alkyl group having 1 to 15 carbon atoms, or an aryl group having 6 to 21 carbon atoms;
  wherein (A1) is a compound selected from compounds (A1/1) to (A1/4), wherein
    (A1/1) are partial esters of an unsaturated carboxylic acid with a polyol seleded from polyols (i) to (vi), wherein
    (i) are dihydric alcohol;
    (ii) are alcohols with a value of 3 to 8 selected from glycerol, trimethylolpropane, pentaerythritol, diglycerol, α-methylglucoside, sorbitol, xylitol, mannitol, glucose, fructose, and sucrose;
    (iii) are polyhydric phenols;
    (iv) are polyether polyols derived from alkylene oxides with a polyhydric alcohol or a polyhydric phenol;
    (v) are polyether polyols derived from alkylene oxides with an amine;
    (vi) are polyester polyols derived from a polyhydric alcohol and a polycarboxylic acid;
    (A1/2) are partially amidated compounds derived from an unsaturated carboxylic acid and a polyamine, or alkanolamides derived from an unsaturated carboxylic acid and an alkanolamine;
    (A1/3) are partial thioester of an unsaturated carboxylic acid with a polythiol;
    (A1/4) are vinyl monomers having a hydroxyl group selected from a p-hydroxylstyrene, (meth)ally alcohol, cinnamyl alcohol, crotonyl alcohol, and alkylene oxide adducts of these compounds.

22. A composition for forming a polyurethane foam which comprises an addition-polymerizable active hydrogen component (A) comprising a compound (A1) with or without not more than 80 mass % of a compound (A0) based on a total mass of the compounds (A1) and (A0), or comprising a compound (A1) and a compound (A2) with or without not more than 80 mass % of a compound (A0) based on the total mass of the compounds (A_b 1) and (A0); the compound (A1) having at least one group containing active hydrogen (w) and at least one addition-polymerizable functional group (x) represented by a general formula (1); the compound (A2) having at least 2.5 groups (w) and not having the group (x); the compound (A0) containing an addition-polymerizable functional group and not having an active hydrogen-containing group, and
  an organic polyisocyanate (B), and which comprises or does not comprise at least one auxiliary (C) selected from the group consisting of blowing agents (C1) and additives (C2), wherein in the case of using a combination of the compounds (A1) and (A2) in the component (A) it is selected from 1 to 3,wherein ① is a compound (A11) having one group (w) as the compound (A1), and a compound with a value of active hydrogen-containing group of at least 40 as the compound (A2);

② is a compound (A12) having at least two groups (w) as the compound (A1), and the compound (A2);

③ is the compound (A11), the compound (A12), and the compound (A2); wherein an amount of (A12) being at least 5 mass % based on total mass of the compounds (A11) and (A12); wherein (1) is

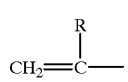  (1)

wherein R denotes hydrogen, an alkyl group having 1 to 15 carbon atoms, or an aryl group having 6to 21 carbon atoms;

wherein (A1) is a compound selected from compounds (A11) and (A1/1) are partial esters of an unsaturated carboxylic acid with a polyol selected from polyols (i) to (vi), wherein (i) are dihydric alcohols;

(ii) are alcohols with a value of 3 to 8 selected from glycerol, trimethylolpropane, pentaerythritol, diglycerol, α-methylglucoside, sorbitol, xylitol, mannitol, glucose, fructose, and sucrose;

(iii) are polyhydric phenols;

(iv) are polyether polyols derived from alkylene oxides with a polyhydric alcohol or a polyhydric phenol;

(v) are polyether polyols derived from alkylene oxides with an amine;

(vi) are polyester polyols derived from a polyhydric alcohol and a polycarboxylic acid;

(A1/2) are partially amidated compounds derived from an unsaturated carboxylic acid and a polyamine, or alkanolamides derived from an unsaturated carboxylic acid and an alkanolamine;

(A1/3) are partial thioesters of an unsaturated carboxylic acid with a polythiol;

(A1/4) are vinyl monomers having a hydroxyl group selected from p-hydrocylstyrene, meth)allyl alcohol, cinnamyl alcohol, crotonyl alcohol, and alkylene oxide adducts of these compounds.

23. An addition-polymerizable active hydrogen component for forming a polyurethane foam which comprises a compound (A1) with or without not more than 80 mass % of a compound (A0) based on a total mass of the compounds (A1) and (A0), or comprises a compound (A1) and a compound (A2) with or without not more than 80 mass % of a compound (A0) based on the total mass of the compounds (A10 and (A0); the compound (A1) having at least one group (x) represented by a general formula (1); the compound (A2) having at least 2.5 groups (w) and not having the group (x); the compound (A0) containing an addition-polymerizable functional group and not having an active hydrogen-containing group, and wherein in the case of using a combination of the compounds (A1) and (A2) it is selected from 1 to 3,wherein ① is a compound (A11) having one group (w) as the compound (A1), and a compound with a value of active hydrogen-containing group of at least 40 as the compound (A2);

② is a compound (A12) having at least two groups (w) as the compound (A10, and the compound (A2);

③ is the compound (A11), the compound (A12), and the compound (A2); wherein an amount of (A12) being at least 5mass % based on a total mass of the compounds (A11) and (A12);

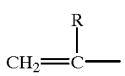  (1)

wherein R denotes hydrogen, an alkyl group having 1 to 15 carbon atoms, or an aryl group having 6 to 21 carbon atoms;

wherein (A1) is a compound selected from compounds (A1/1) to (A1/4), wherein (A1/1) are partial esters of an unsaturated carboxylic acid with a polyol selected from polyols (i) to (vi), wherein (i) are dihydric alcohols;

(ii) are alcohols with a value of 3 to 8 selected from glycerol, trimethylolpropane, pentaerythritol, diglycerol, α-methylglucoside, sorbitol, xylitol, mannitol, glucose, fructose, and sucrose;

(iii) are polyhydric phenols;

(iv) are polyether polyols derived from alkylene oxides with a polyhydric alcohol or a polyhydric phenol;

(v) are polyether polyols derived from alkylene oxides with an amine;

(vi) are polyester polyols derived from polyhydric alcohol and a polycarboxylic acid;

(A1/2) are partial thioesters of an unsaturated carboxylic acid and a polyamine, or alkanolamides derived from an unsaturated carboxylic acid and an alkanolamine;

(A1/3) are partial thioesters of an unsaturated carboxylic acid with a polythiol;

(A1/4) are vinyl monomers having a hydroxyl group selected from p-hydroxylstyrene, (meth)allyl alcohol, cinnamyl alcohol, crotonyl alcohol, and alkylene oxide adducts of these compounds.

24. The polyurethane foam according to claim 17, wherein the addition polymerization chains and the polyurethane chans are crosslinked in the presence of a polymerization initiator.

25. The polyurethane foam according to claim 2, wherein the combination of the compounds (A1) and (A2) in the component (A) is selected from the group of ② is a compound (A12) having at least two groups (w) as the compound (A1), and the compound (A2); and ③ is the compound (A11) the compound (A12), and the compound (A2); wherein an amount of (A12) being at least 5 mass % based on a total mass of the compounds (A11) and (A12).

26. The polyurethane foam according to claim 2, which is obtained by reacting the component (A) with the polyisocyanate (B) in the presence of said auxiliary (C) comprising a radical-polymerization initiator to polymerize the addition-polymerizable functional group simultaneously with polyurethane formation.

27. The process according to claim 21, wherein the component (A) is reacted with the polyisocyanate (B) in the presence of said auxiliary (C) comprising a radical-polymerization initiator to polymerize the addition-polymerizable functional group simultaneously with polyurethane formation.

28. The composition according to claim 22, which contains said auxiliary (C) comprising a radical-polymerization initiator.

29. The addition-polymerizable active hydrogen component according to claim 23, which is capable of forming a rigid polyurethane foam and satisfies a requirement that a M value expressed by a following equation (2) is not more than 500:

$$M = J/(K + L_{x\,2-2}) \tag{2}$$

wherein J denotes a (numver average molecular weight of the component (A); K denotes an (average) number of the active hydrogen-containing group per molecule of the component (A); and L denotes an (average) number of the addition-polymerizable functional group per molecule of the component (A); the compound (A2) having a value of active hydrogen-containing group of 200–1000.

* * * * *

UNITED STATES PATENT AND TRADEMARK OFFICE
CERTIFICATE OF CORRECTION

PATENT NO.    : 6,455,606 B1
DATED         : September 24, 2002
INVENTOR(S)   : Kaku et al.

It is certified that error appears in the above-identified patent and that said Letters Patent is hereby corrected as shown below:

Column 41,
Line 27, "vlowing agents and additives to polyurethane" should read -- blowing agents and additives to polymerize the addition-polymerzable functional group and simultaneously form a --
Line 59, "mannito, glucose, fructose, and sucrouse;" should read -- mannitol, glucose, fructose, and sucrose; --

Column 42,
Line 5, "thioesterof" should read -- thioesters of --
Line 8, "1-hydroxylstyrene," should read -- p-hydroxylstyrene, --
Line 12, please delete the word "polymerizable"
Line 22, please delete "which addition"
Line 23, please delete "polymerization"
Line 39, "at least 40as" should read -- at least 40 as --
Line 43, "is a compound (A11)," should read -- is the compound (A11), --
Line 53, "having 1to" should read -- having 1 to --
Line 54, "15carbon" should read -- 15 carbon --
Line 64, "trimathylolpropane" should read -- trimethylolpropane --

Column 43,
Lines 1 and 3, "oxiders" should read -- oxides --
Lines 29 and 39, "2 or 3," should read -- 2 --
Line 33, "C." should read -- C --

Column 44,
Line 20, "2 or 3," should read -- 2 --
Line 41, "under condition" should read -- under a condition --
Line 50, "C. is" should read -- C is --

Column 45,
Line 20, "pentaerythrit," should read -- pentaerythritol --
Lines 24 and 26, "oxiders" should read -- oxides --
Line 28, "apolyhydric" should read -- a polyhydric --
Line 32, "alkanolamiders" should read -- alkanolamides --
Line 35, "with polythiol;" should read -- with a polythiol; --
Line 55, "loeast" should read -- least --

Column 46,
Line 45, "thioester" should read -- thioesters --
Line 48, "from a p-hydroxylstyrene," should read -- from p-hydroxylstyrene, --
Line 58, "(A_b 1)" should read -- (A1) --

UNITED STATES PATENT AND TRADEMARK OFFICE
CERTIFICATE OF CORRECTION

PATENT NO. : 6,455,606 B1
DATED : September 24, 2002
INVENTOR(S) : Kaku et al.

It is certified that error appears in the above-identified patent and that said Letters Patent is hereby corrected as shown below:

Column 47,
Line 13, "on total" should read -- on a total --
Line 22, "6to" should read -- 6 to --
Line 24, "(A11) and" should read -- (A1/1) to (A1/4), wherein --
Line 46, "p-hydrocylstyrene, meth)allyl" should read -- p-hydroxylstyrene (meth)allyl --
Line 57, "group (x) repreesented" should read -- group containing active hydrogen (w) and at least one addition-polymerizable funcational group (x) represented --

Column 48,
Line 2, "(A10" should read -- (A1) --
Line 33, "partial thioesters of" should read -- partially amidated compounds derived from --
Line 52, "(A11) the" should read -- (A11), the --

Column 49,
Line 10, "$M=J/(K+L_{x2-2})$" should read -- $M=J/(K+Lx2-2)$ --

Column 50,
Line 1, "(numver average molecular" should read -- (number average) molecular --

Signed and Sealed this

Twenty-eighth Day of October, 2003

JAMES E. ROGAN
*Director of the United States Patent and Trademark Office*